(12) United States Patent
Williams

(10) Patent No.: US 6,300,595 B1
(45) Date of Patent: *Oct. 9, 2001

(54) METHOD OF THREE DIMENSIONAL LASER ENGRAVING

(75) Inventor: Mark S. C. Williams, Lee's Summit, MO (US)

(73) Assignee: High Tech Polishing, Inc., Summit, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/362,177

(22) Filed: Jul. 27, 1999

Related U.S. Application Data

(63) Continuation-in-part of application No. 09/325,065, filed on Jun. 3, 1999.

(51) Int. Cl.[7] .................................................. B23K 26/38
(52) U.S. Cl. ................................ 219/121.69; 219/121.68
(58) Field of Search ..................... 219/121.68, 121.69, 219/121.83

(56) References Cited

U.S. PATENT DOCUMENTS

| | | | |
|---|---|---|---|
| 3,920,951 | * | 11/1975 | Chovan et al. . |
| 4,001,840 | * | 1/1977 | Becker et al. . |
| 4,918,611 | * | 4/1990 | Shyu et al. . |
| 4,968,064 | | 11/1990 | Mancuso . |
| 5,067,086 | * | 11/1991 | Yamazaki et al. .............. 219/121.83 |
| 5,336,458 | | 8/1994 | Hutchinson et al. . |
| 5,364,494 | | 11/1994 | Hutchinson et al. . |
| 5,660,668 | * | 8/1997 | Matheson et al. .............. 219/121.68 |
| 5,880,430 | | 3/1999 | Wein . |
| 6,043,452 | * | 3/2000 | Bestenlehrer ................... 219/121.69 |

OTHER PUBLICATIONS

"Prismatic Imaging" brochure, R.J.M. Graphics, Inc., Middleboro, MA, No Publication Date.
"FOBA–LAS" brochure, FOBA North America Laser Systems, Lee's Summit, MO, No Publication Date.
"He had the idea . . . " brochure, FOBA Elektronik + Lasersysteme, Ludenscheid, Germany, No Publication Date.
Precise Laser Engraving . . . : brochure, High Tech Laser, division of High Tech Polishing Inc., Lee's Summit, MO No Publication Date.

* cited by examiner

Primary Examiner—Geoffrey S. Evans
(74) Attorney, Agent, or Firm—Chase & Yakimo, L.C.

(57) ABSTRACT

A method for laser engraving a three-dimensional image into a workpiece according to color shades found in an original piece of artwork. The original piece of artwork is separated into a plurality of illustrations with each illustration corresponding to a particular layer of material to be removed from the workpiece in accordance with a selected color shade found in the original artwork. The illustrations are sequentially read by laser system program software which translates the lines on each illustration into signals corresponding to laser paths. The signals are received by the laser system control assembly for directing the laser beam along the workpiece in a layer-by-layer relationship corresponding to the sequentially read illustrations. The use of the plurality of illustrations allows for a layer-by-layer removal of material in the workpiece in correspondence with the various color shades on the original piece of artwork. As such the power of the laser need not be continuously adjusted according to the desired depth of penetration into the workpiece. The method allows for various images to be engraved into the workpiece in accordance with the original artwork.

20 Claims, 42 Drawing Sheets

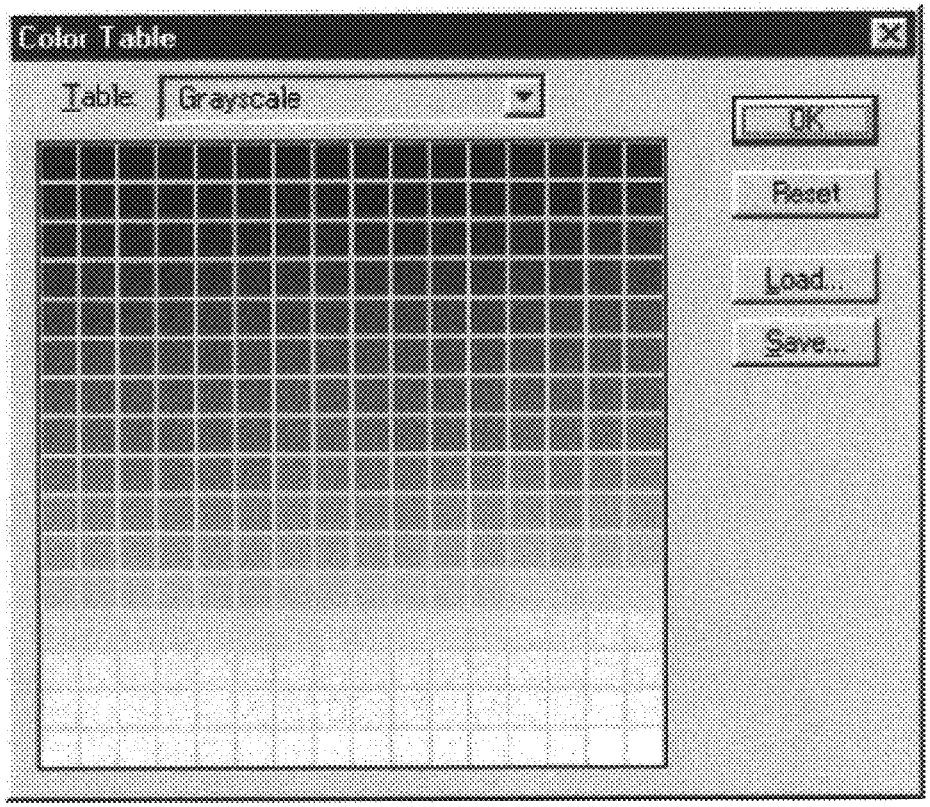
FIG. 12
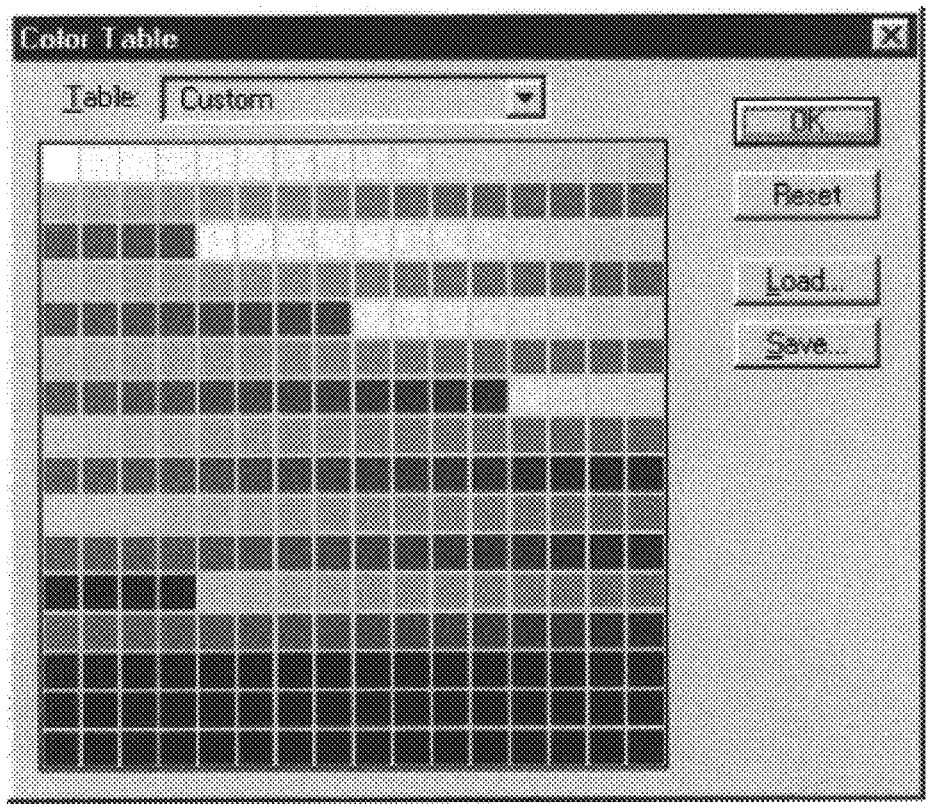

FIG. 13M
FIG. 13N
FIG. 13O
FIG. 13P

METHOD OF THREE DIMENSIONAL LASER ENGRAVING

CROSS-REFERENCE TO RELATED APPLICATION

This application is a continuation-in-part of application Ser. No. 09/325,065, filed Jun. 3, 1999, entitled METHOD OF THREE DIMENSIONAL LASER ENGRAVING.

BACKGROUND OF THE INVENTION

This invention relates to a process for engraving an image into a workpiece and, more particularly, to a method for engraving of an image into a die plate by utilizing a layer-by-layer removal of material from the workpiece between the surface of the workpiece and the deepest point of the engraving into the workpiece.

Today's laser system technology utilizes a program software which translates artwork of a desired image into control signals. The signals are directed to a control assembly which focuses a laser beam onto a separate workpiece according to lines of the artwork. The engraving is carried out by thermal interaction between the laser beam and the workpiece. The finished workpiece may be a mold for embossed items.

Heretofore, if the depth of the engraved image in the workpiece was not constant, the variations in the depths of the image were addressed by increasing the power (watts) of the laser. This increase of power increases the depth of laser penetration into the workpiece and thus the depth of material removed. The need to vary the power leads to inefficient laser use as continuous power adjustments need be made during the laser engraving process.

I have invented a method, which more efficiently addresses the penetration of the laser into the workpiece without the need to continuously adjust the laser power.

My method utilizes available computer and laser system technology, e.g., the FOBA-LAS F94 and F114 laser engraving system distributed by FOBA North America Laser Systems of Lee's Summit, Mo., or similar galvo beam drive Nd:yag lasers. Such a system includes computer program technology, which converts lines on provided artwork to control signals. The control assembly, responsive to such signals, guides the laser beam along the separate workpiece in correspondence to lines on the provided artwork. My method presents to a galvo driven Nd:yag laser system a composite piece of artwork comprising a plurality of pieces of artwork which form the overall image desired for engraving into the workpiece. Each piece of artwork has lines appearing thereon which the laser system software converts into laser paths of material removal. Each piece of artwork corresponds to a layer of material in the workpiece between the surface of the workpiece and the deepest point thereof. The laser system program software reads these pieces of artwork in a sequential manner starting with the top layer of the workpiece and descending therefrom. Upon completion a three-dimensional image will be engraved into the workpiece. The use of the plurality of artwork pieces corresponding to material layers provides for a layer by layer removal of material from the workpiece which precludes the need to adjust laser power.

This above method is particularly used for engraving a three-dimensional image into a die plate/mold used for forming items having embossed images thereon.

It is accordingly a general object of this invention to provide a method of engraving a three-dimensional image having variously exposed sloped surfaces at various depths into a workpiece, e.g., a mold/die plate utilizing available laser system technology.

Another object of this invention is to provide a method, as aforesaid, which engraves an image into a workpiece utilizing a layer by layer removal of material from the workpiece.

A further object of this invention is to provide a method, as aforesaid, which precludes the need to continuously adjust the laser beam power during engraving of the workpiece.

Another object of this invention is to provide a method, as aforesaid, which utilizes a plurality of pieces of artwork comprising the desired image to be engraved into the workpiece with each piece of artwork corresponding to a selected color shade or shades and a layer of material to be removed from the workpiece.

Still another object of this image is to provide a method, as aforesaid, which can be performed utilizing available computer technology for providing the artwork pieces in correspondence to various shades of colors appearing in an initial piece of artwork.

A further object of this invention is to provide a method, as aforesaid, which increases the efficiency of use of a laser engraving system.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 12 is a table provided by the Adobe PhotoShop software designating the shades of gray appearing in the FIG. 11 engraving;

DESCRIPTION OF THE PREFERRED EMBODIMENT

Figure 1:
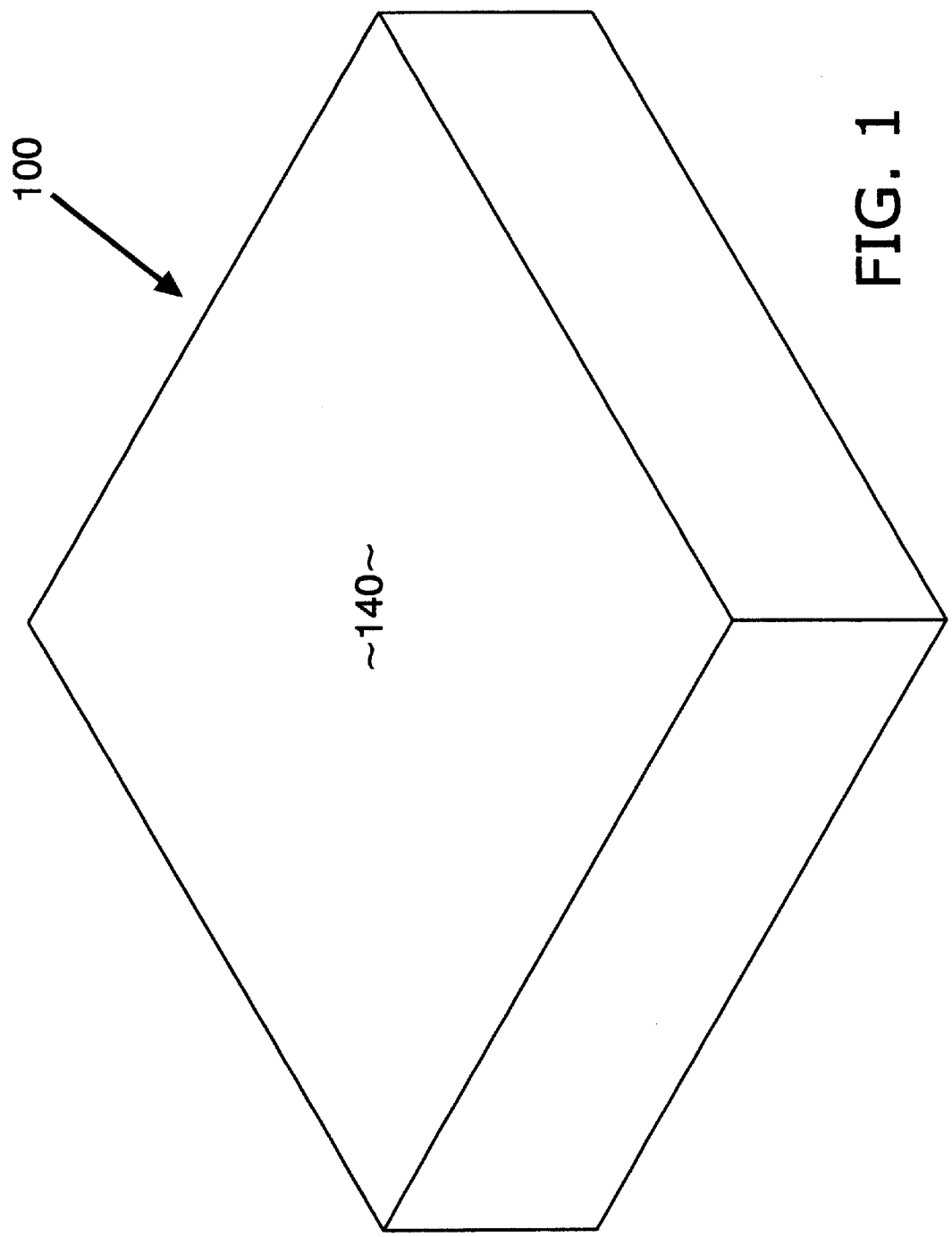
FIG. 1 is a perspective view of an unengraved workpiece.

Turning more particularly to the drawings, FIGS. 1–15 are used to illustrate my method. Although my method can be manually implemented one preferably utilizes available computer software, e.g., AutoCad, Adobe Photoshop, CorelPaint, or other similar compatible software which may be integrated into the utilized laser system.

My method is best used in connection with a laser engraving system which includes its own program software capable of transforming lined artwork into control signals for delivery to a laser control assembly. One laser engraving system utilized is the FOBA-LAS F94 or F114 laser engraving system designed for mold surface engraving. Either system is available from FOBA® North America Laser Systems in Lee's Summit, Mo. The FOBA® system includes Fobagraf software capable of reading the lined artwork depicting the design which is to be engraved into the mold surface. The design artwork is entered into the system in a file format. The laser system software recognizes lines on the artwork as laser paths. In turn, the software generates control signals for delivery to the laser control assembly. The control assembly directs the laser along the workpiece in correspondence to the lines on the design artwork. My invention is directed to a method of creating a plurality of pieces of composite artwork which directs the laser at a constant power along the workpiece in a layer-by-layer manner to arrive at the desired engraving.

Heretofore, the depth of the laser beam penetration into the mold/workpiece was varied by adjustment of the laser power (watts). The greater the power the greater the depth of laser beam penetration into the workpiece. The need to continuously adjust the laser power was not conducive to efficient laser engraving of a three-dimensional engraving into the workpiece.

In my method a plurality of pieces of artwork, representative of the overall design, is created for sequential presentation to the laser program software. Each piece of artwork designates the portions of a layer of material in the workpiece which is to be removed. Each piece of artwork has lines thereon which dictates the laser paths for a corresponding material layer. The laser program software converts the lines on each artwork piece to signals for delivery to a control assembly which guides laser movement. Thus, the laser removes the material from the workpiece for that particular layer according to the lines appearing on the particular corresponding piece of artwork.

The sequential pieces of artwork are created utilizing available Adobe PhotoShop software. This software can analyze and break down the colors appearing on an original piece of artwork into a possible 256 grayscale shades between the blackest and whitest shades. The Adobe PhotoShop program software can also provide illustrations which depicts the portions of the original piece of artwork which contains a particular shade or combination of shades. Each such illustration is then converted into lined artwork. As above described these lines are recognized by the laser system software as laser paths. A plurality of illustrations of lined artwork can be generated which overall presents a composite of the design in the original piece of artwork which is to be engraved into the workpiece. Each illustration/drawing designates the portion of the workpiece to be removed from a particular layer in the workpiece. These illustrations are presented to the laser system software in a sequential fashion with the first illustration corresponding to the top layer of material in the workpiece, the second illustration corresponding to the next lower layer below the first layer and so on. The laser system program software reads the lines on each of these illustrations which are converted to control signals and delivered to the laser beam assembly so that the laser removes material from a layer of the workpiece according to the lines on the corresponding illustration.

In the generated illustrations the first illustration representing the darkest shade corresponds to the top layer of the workpiece. This illustration designates the portions of the original artwork which contains the darkest shade as well as all the shades in the original artwork that are lighter than this darkest shade. The next illustration corresponds to the second layer of material to be removed. This illustration designates the portions of the artwork which contains the shade for the second layer as well as all shades that are lighter than this second shade. This process is continued for each subsequent illustration corresponding to each subsequent material layer. Thus, the sequence of illustrations from the darkest shade to the lightest shade in the original artwork corresponds to successively deeper material layers in the workpiece. If desired, this above sequence can be reversed such that the initial illustration in the plurality of generated illustrations corresponds to the lightest shade and the topmost layer in the workpiece.

For ease of illustration and not limitation, I depict my method for engraving into a die block/workpiece 100 (FIG. 1). It is understood that the engraved images will vary in complexity according to the complexity of the chosen design. The images depicted herein are a hemisphere/dome 110 (FIGS. 2–5), a pyramid 600 (FIGS. 6–10) and an angel plaque 400 (FIGS. 11–15).

Figure 2:
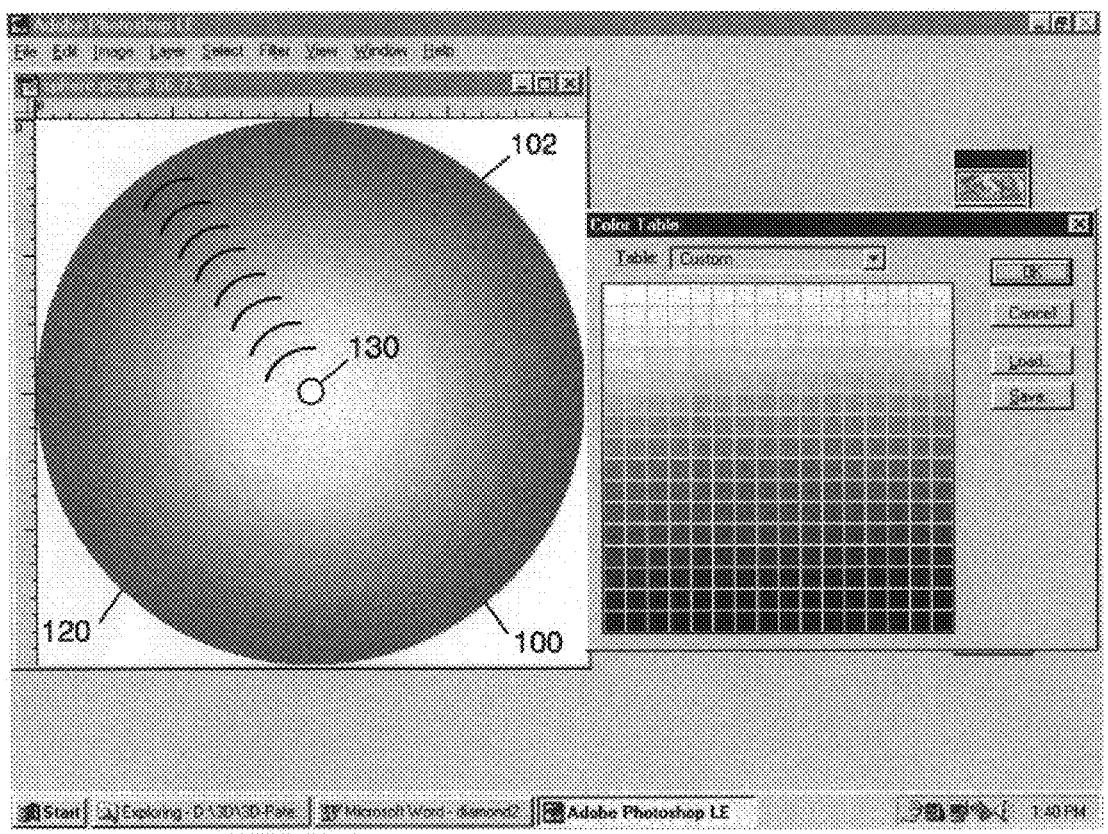
FIG. 2 is a two-dimensional drawing of a hemispherical dome with the shades of gray therein designating the various depths or three-dimensional aspects of the dome and also showing a matrix generated by Adobe PhotoShop software which designates the shades of gray found in the two-dimensional drawing.

FIG. 2 illustrates a piece of black and white artwork 100 depicting a top view of the hemispherical dome. As shown the artwork 100 has shades of gray thereon with the darkest shade appearing as a first ring about the perimeter 102 and successively lighter shades of gray occurring as successively reduced rings as the center ring of the hemispherical dome 110 is approached. (Arc portions of each ring have been added to aid in illustration.) Thus, the whitest ring 130 in the drawing is at the center of the FIG. 2 drawing and corresponds to the apex 130 of the dome which will be the deepest portion to be engraved into the workpiece.

Heretofore, to engrave a hemispherical dome into the workpiece 100 the laser power would have been increased as it progressed between the perimeter 120 of the dome 110 on the workpiece surface 140 and the apex/deepest part 130 of the workpiece as the amount of block material, which needed to be removed, increased between the perimeter 120 and apex 130.

In my method the laser power need not be increased as the block material is removed in layers of constant thickness between the block surface 140 and deepest layer containing vertex 130. The material to be removed in each layer is designated by the corresponding pieces forming the composite artwork of the dome.

To implement my method, the FIG. 2 drawing, having the various shades of gray therein decreasing in darkness from the perimeter towards the center thereof, is presented to the Adobe PhotoShop program software. This software analyzes this FIG. 2 drawing according to known grayscale colors. The software can determine the shades or colors of the grayscale which appear in the drawing.

Figure 2A:
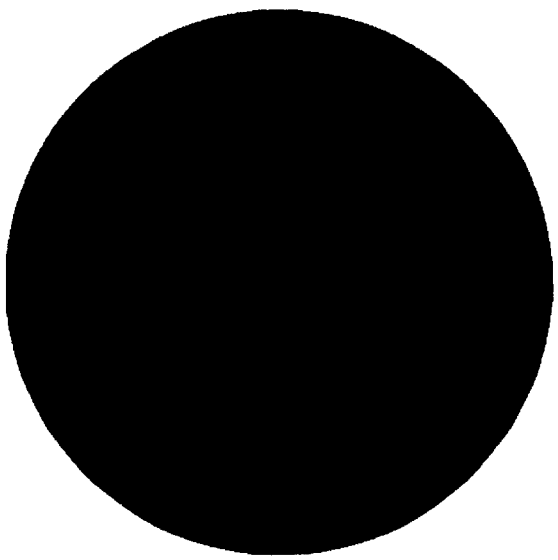
FIGS. 2a–2h are a series of illustrations generated by the Adobe PhotoShop software showing the portions of the FIG. 2 drawing which have selected shades of gray therein.
Figure 2B:
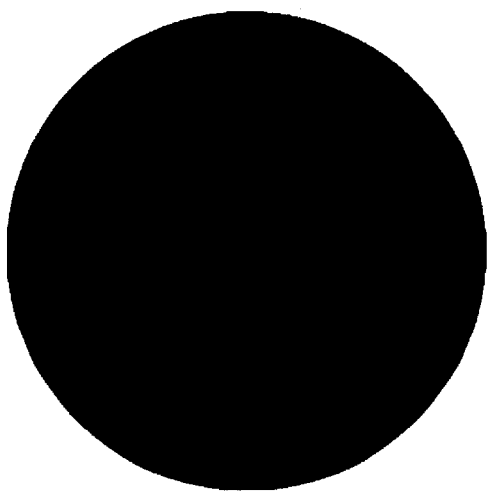
Figure 2C:
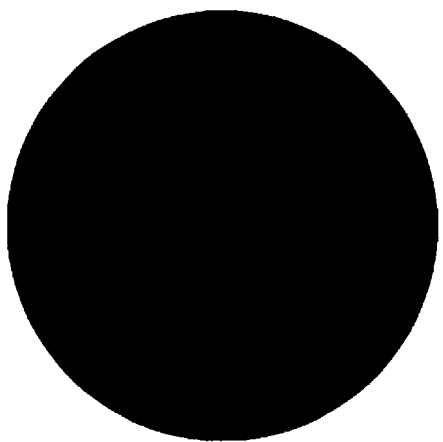
Figure 2D:
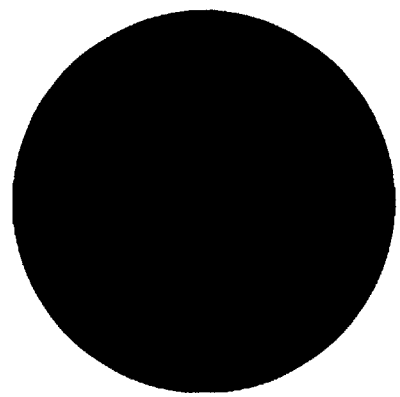
Figure 2E:
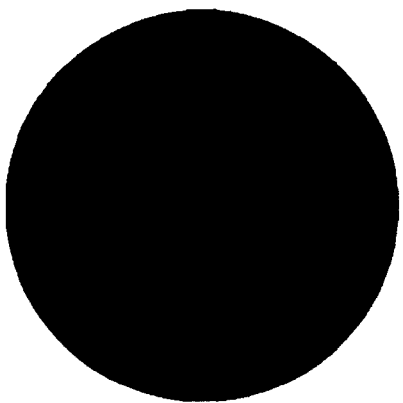
Figure 2F:
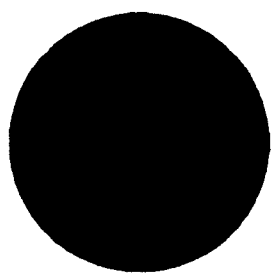
Figure 2G:
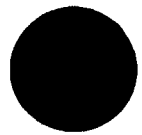
Figure 2H:
Figure 3A:
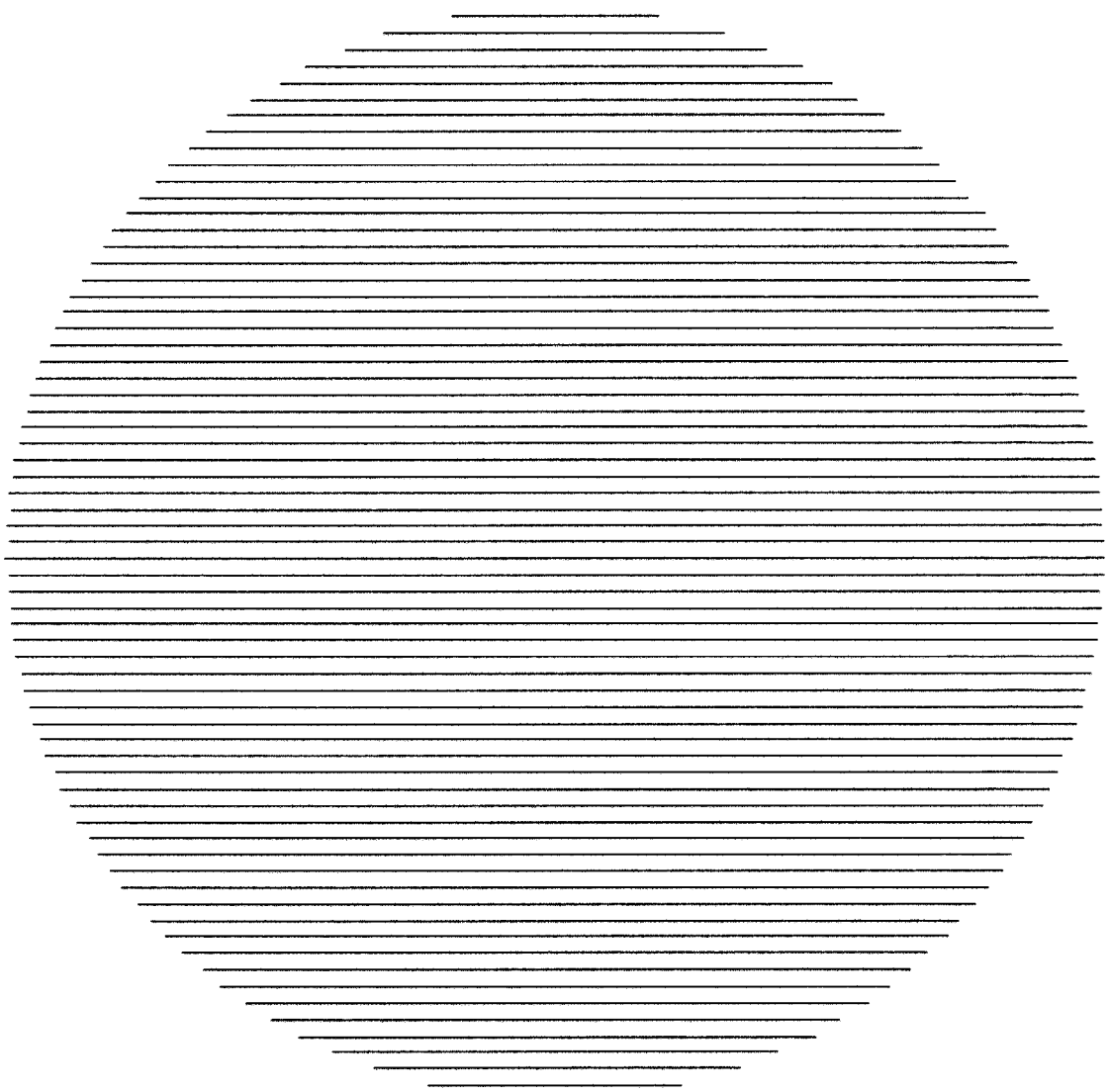
FIGS. 3a–3h are reverse, unshaded illustrations of the illustrations of FIGS. 2a–2h with lines therein corresponding to laser paths.
Figure 3B:
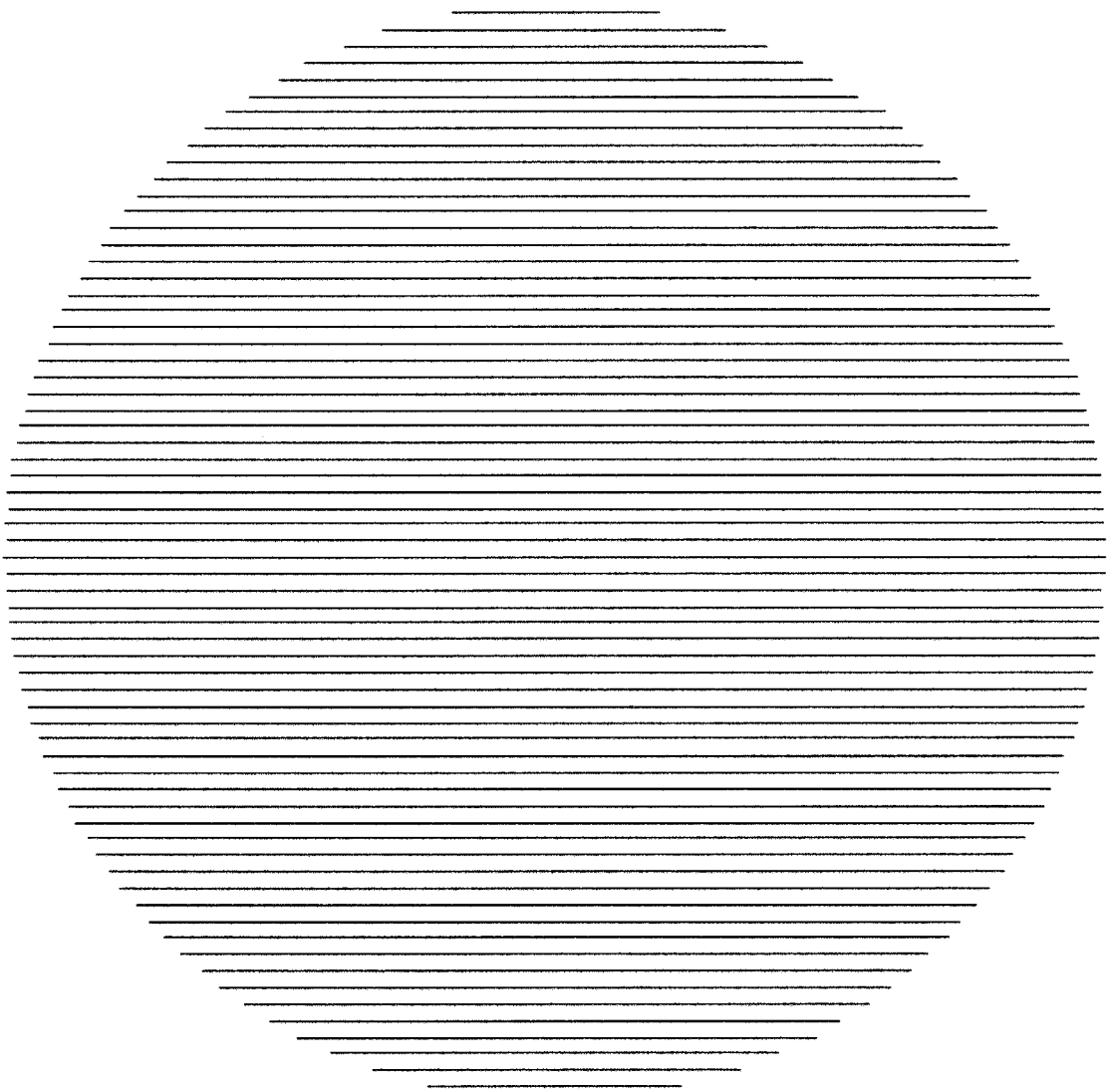
Figure 3C:
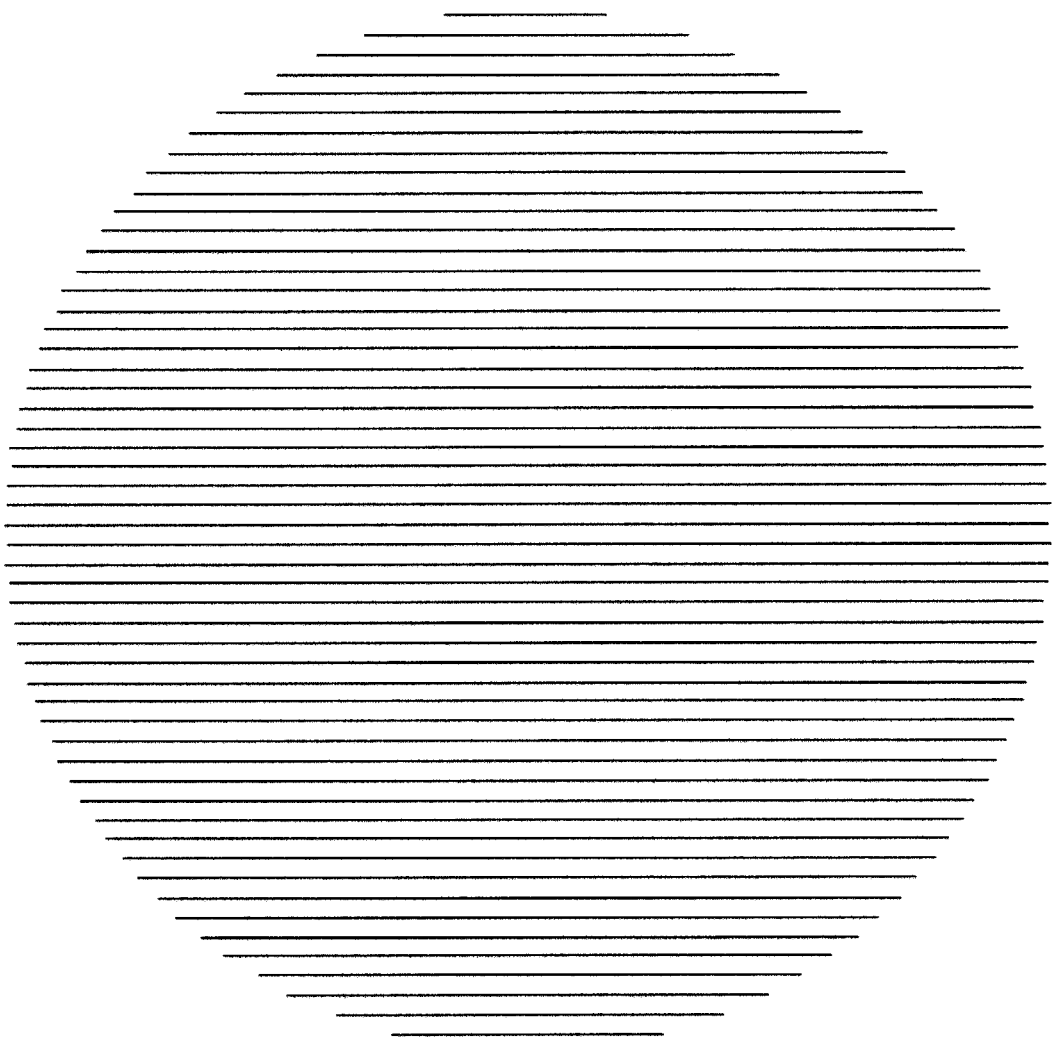
Figure 3D:
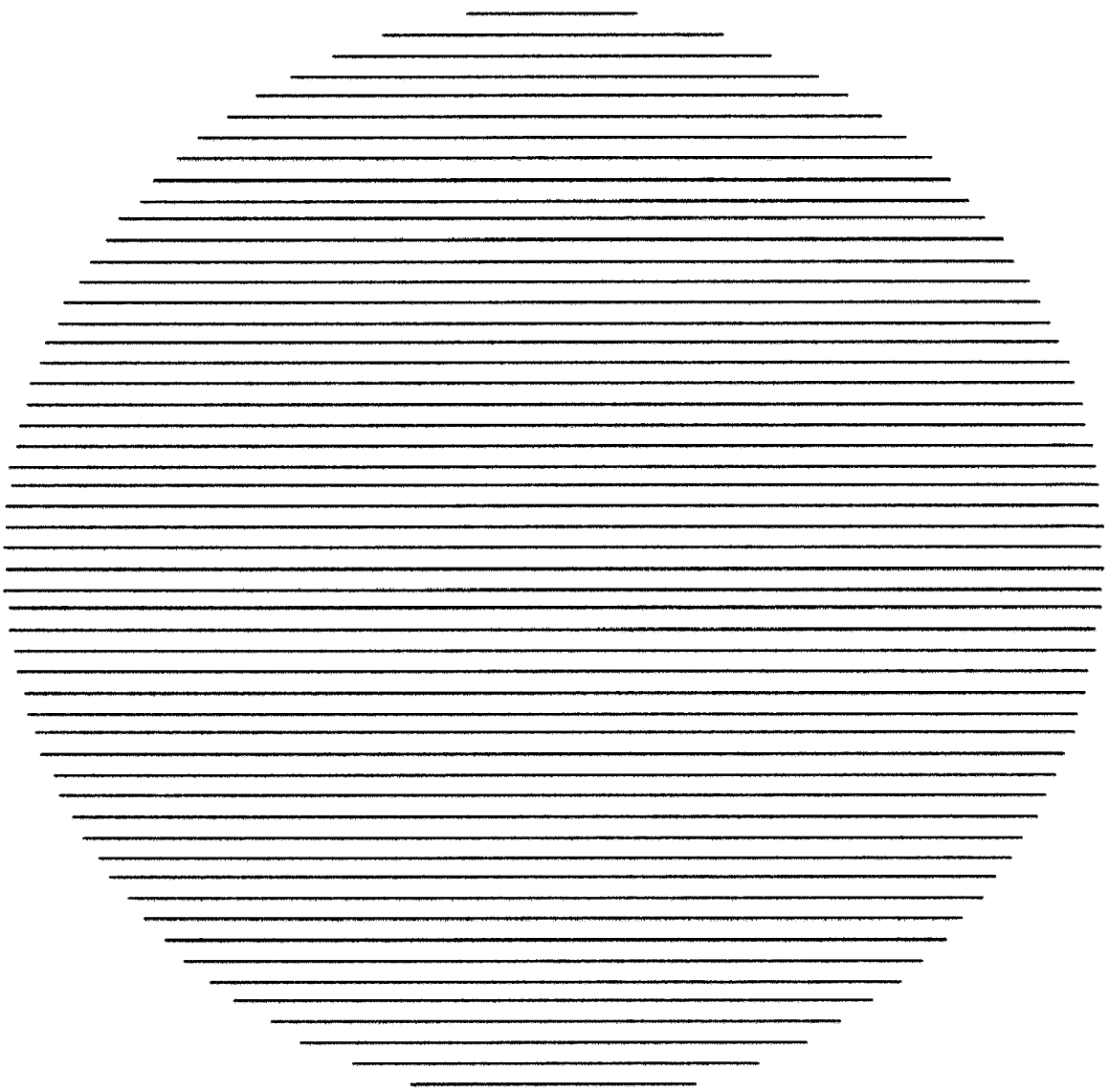
Figure 3E:
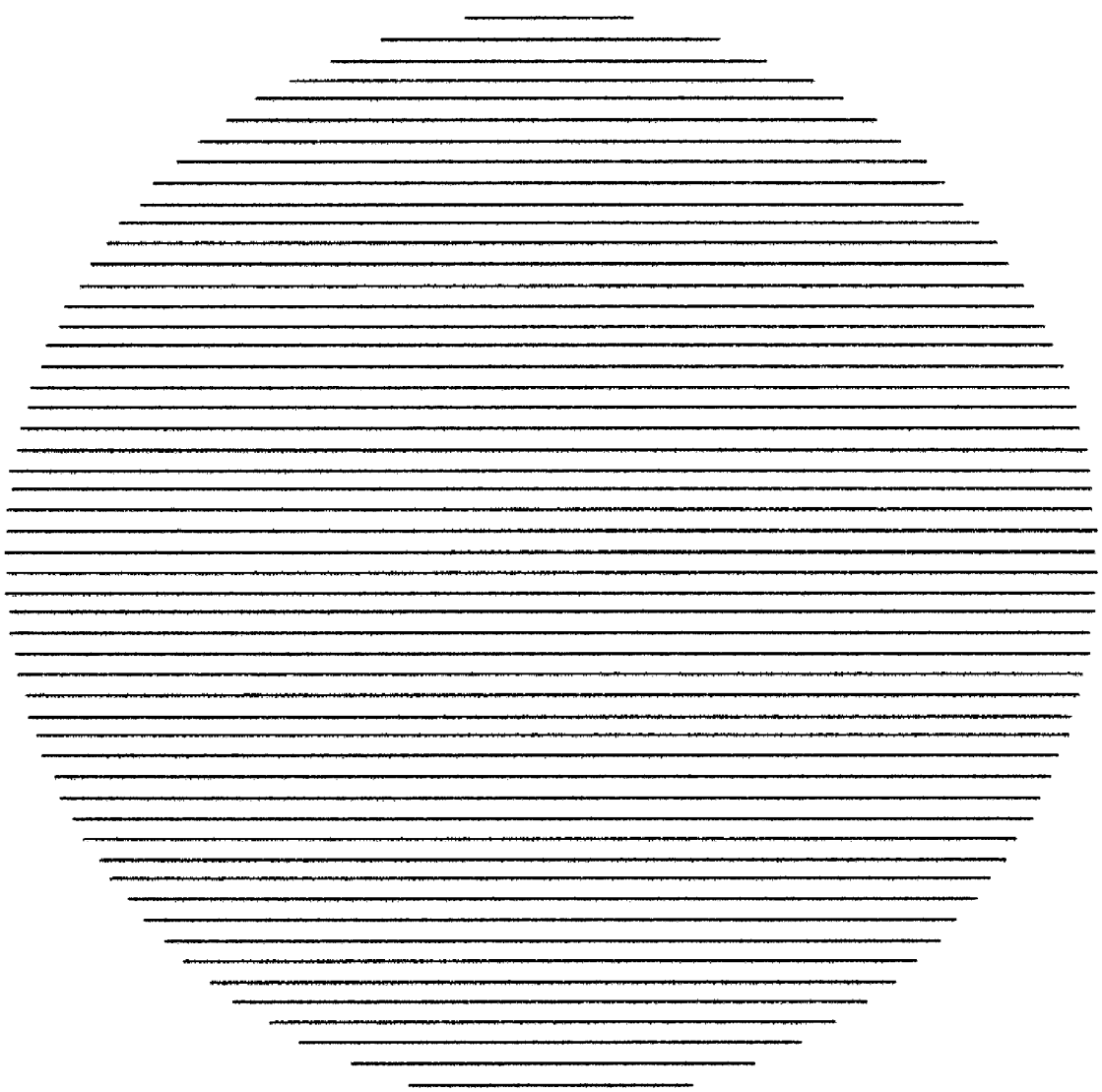
Figure 3F:
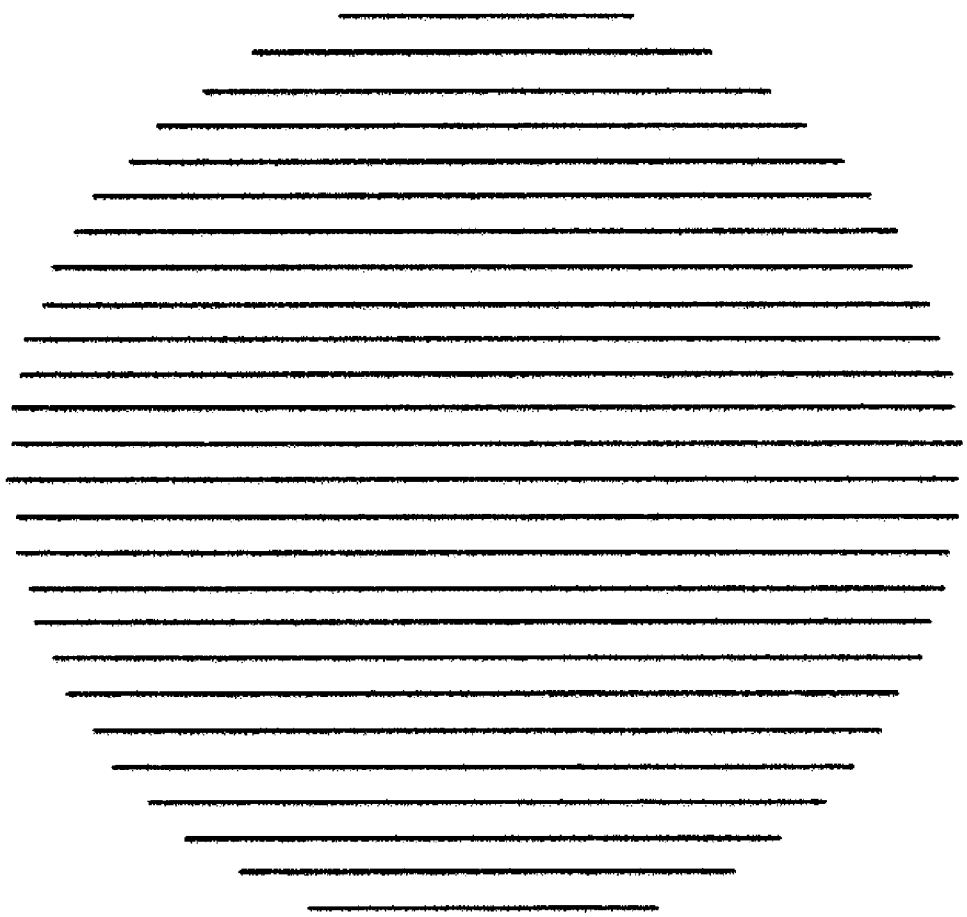
Figure 3G:
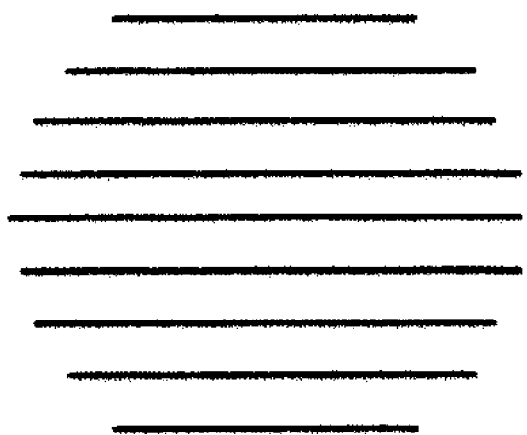
Figure 3H:
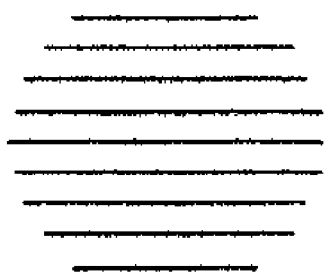

As shown in FIG. 2, the PhotoShop presents a table in the form of a 16×16 matrix which indicates in a particular block of the matrix whether a particular shade of the grayscale has been found in the analyzed image. The PhotoShop program software enables one to select a shade which appears in one of the 256 blocks in the table. Once selected the software can produce an illustration of the portions of the FIG. 2 drawing containing the selected shade as well as all lighter shades relative to the selected shade. Assuming that the portions of the drawing corresponding to the darkest shade are to be engraved in the topmost layer of the workpiece, the lighter shades correspond to portions to be engraved in lower layers of the workpiece. Thus, to remove material in these lower layers the material from the upper layers of the workpiece must be first removed. Accordingly, the illustration corresponding to the darkest shade and topmost layer not only contain the portions to be removed for that particular top layer but also the portions to be removed from the top layer in order to reach lower layers. As such, FIG. 2*a* corresponding to the first material layer is completely black as it contains the portions of the FIG. 2 drawing containing the selected darkest shade and the removed material to provide complete access to the next lower layer. FIG. 2*b* corresponds to the next lighter shade as well as all lighter shades found in the drawing. This FIG. 2*b* illustration does not contain the darker shades of the drawing as it is in the FIG. 2*a* illustration only. FIG. 2*b* contains the portions to be removed in the second layer corresponding to the shade selected for that layer as well as the portions corresponding to lighter shades to be removed in lower layers. As shown, this process continues through FIGS. 2*c*–2*h*. FIG. 2*h* corresponds to center ring 130 as it contains the lightest shade. As such, FIGS. 2*a*–2*b* present successively smaller circles. Thus, the original piece of provided artwork must recognize that the shades of gray dictate the penetration of the laser into the workpiece when the original artwork is prepared.

Once the above images have been provided the black images of FIGS. 2*a*–2*h* are presented to the laser software. The laser software recognizes these black images as portions to be engraved into the workpiece. As such the laser software changes the black portions to lines. These lines are recognized as laser paths by the laser system software. This action results in a plurality of lined drawings (FIGS. 3*a*–3*h*) corresponding to the successive layers of material to be removed from the workpiece. Crosshatched lines can also be used. The extent of the laser path lines/crosshatching is dictated by the width of the laser beam. It is understood that computer programs, e.g., the AutoCAD, or any other similar or compatible software programs, are available to perform the insertion of the lines/crosshatching therein. Also, a computer program may be devised which will read the FIGS. 2*a*–2*h* images and provide a reverse image with laser lines therein. Thus, a plurality of illustrations are now ready.

The plurality of artwork illustrations (FIGS. 3*a*–3*h*) is then placed in a file format for sequential reading by the computer program of the laser system. The program software reads the first FIG. 3*a* drawing corresponding to the topmost layer. The laser software directs the laser along all lines on this first drawing. Thus, the first layer of material is removed. As each sequential, piece of artwork is presented to the program software, the laser removes the material from the successively deeper layer in the workpiece corresponding to the lines in each drawing. This process is performed for each illustration (FIGS. 3*a*–3*h*) corresponding to a subsequently inferior/deeper material layer to be removed from the workpiece 100. This process continues until the laser reaches the last piece of artwork which contains the deepest point 130 of the image to be engraved. It is understood that the process can be reversed such that the topmost layer corresponds to the lightest shade and the deepest layer corresponds to the darkest shade.

Figure 4:
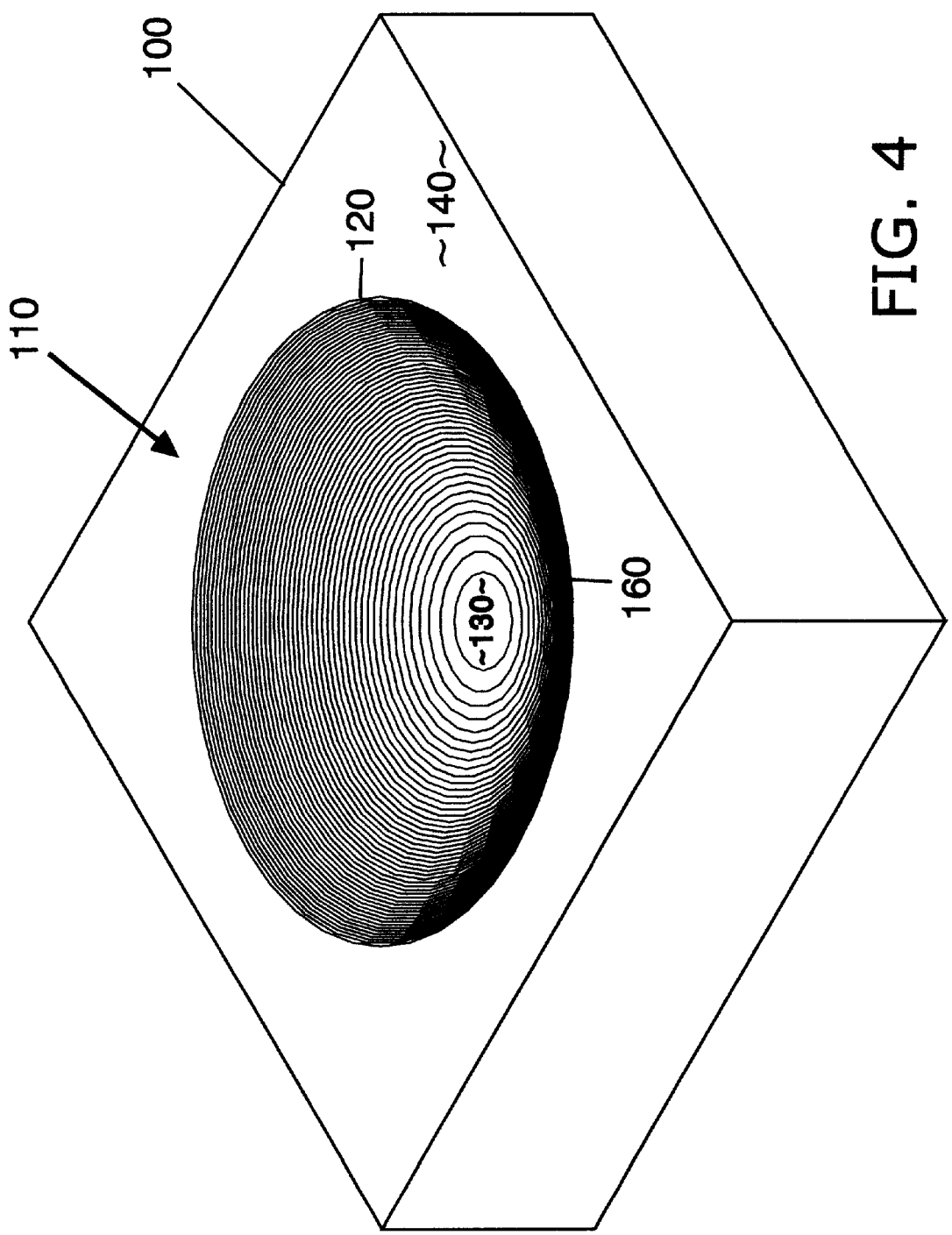
FIG. 4 is a perspective view of the workpiece of FIG. 1 with the hemispherical dome engraved therein.
Figure 5:
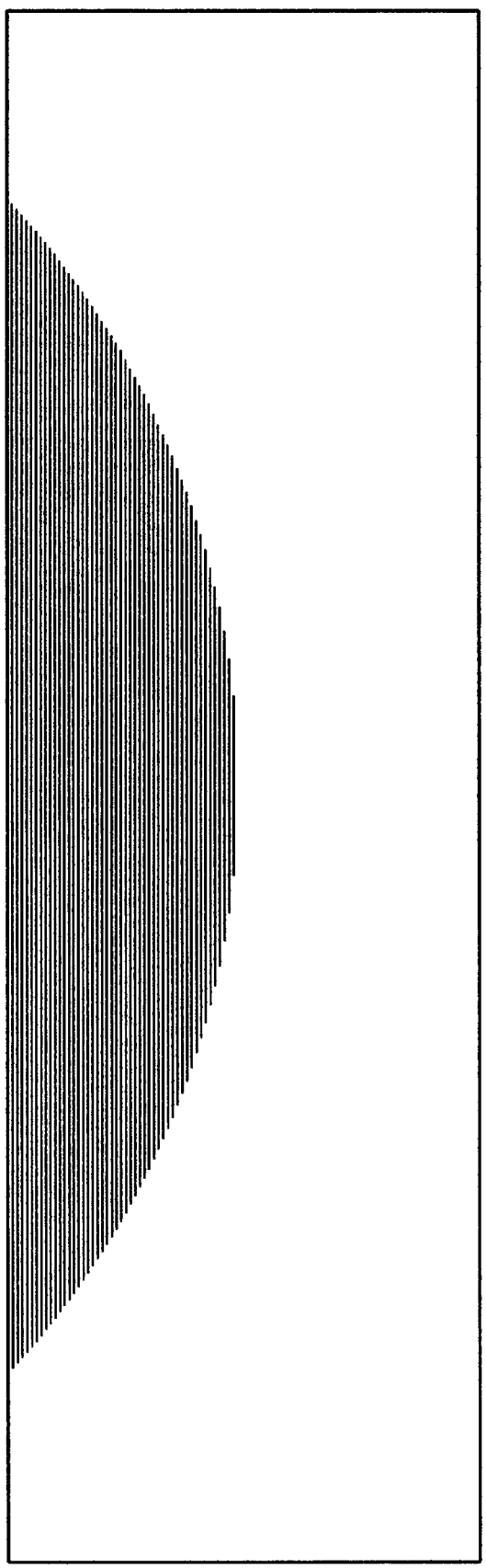
FIG. 5 is a sectional elevation view of the workpiece of FIG. 4.

FIG. 4 shows the dome engraved in the workpiece, the parallel lines therein defining a material layer. (FIG. 4 shows a greater number of layers being removed than drawings 3*a*–3*h*. However, it is understood that each layer has its own lined drawing dictating material removed from that layer.)

Initially, the power of the laser is set so as to penetrate a chosen depth corresponding to the thickness of each material layer. As each sequential piece of artwork is presented, the laser will penetrate deeper into the workpiece at such chosen penetration. As the superior layer of block material has already been removed to provide lower layer access, the laser always passes through air prior to any material penetration in a chosen layer. Accordingly, the power of the laser need not be adjusted.

Figure 6:
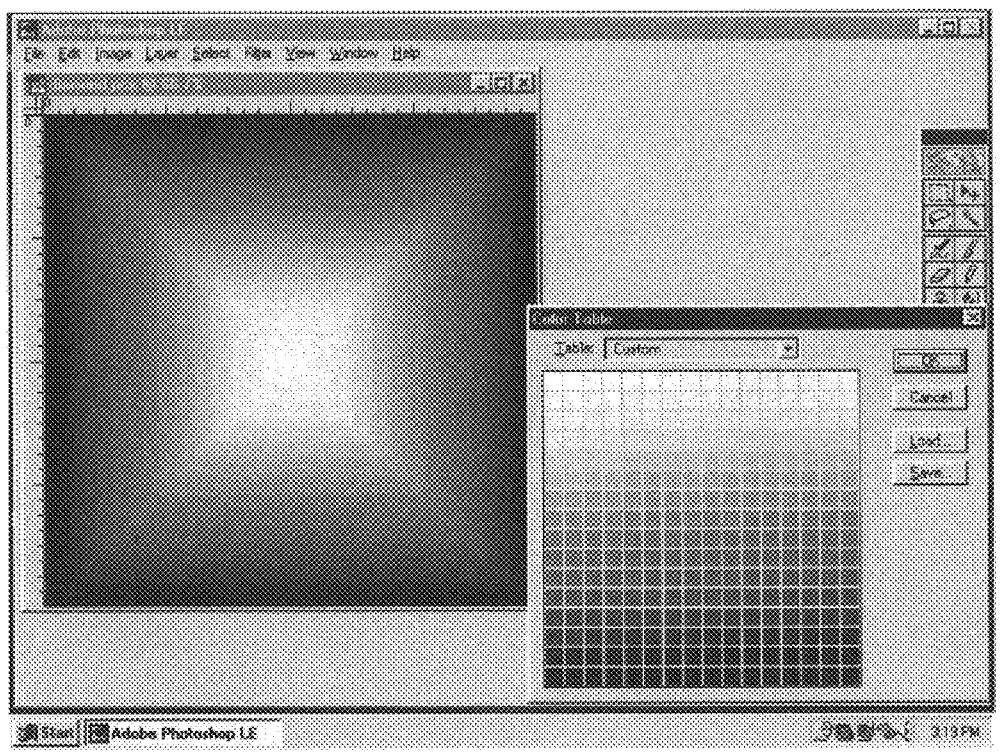
FIG. 6 is a two-dimensional drawing of a pyramid with shades of gray therein designating the various depths or three-dimensional aspects of the pyramid and also showing a matrix generated by the Adobe PhotoShop software which designates the shades of gray found in the two-dimensional drawing.
Figure 7A:
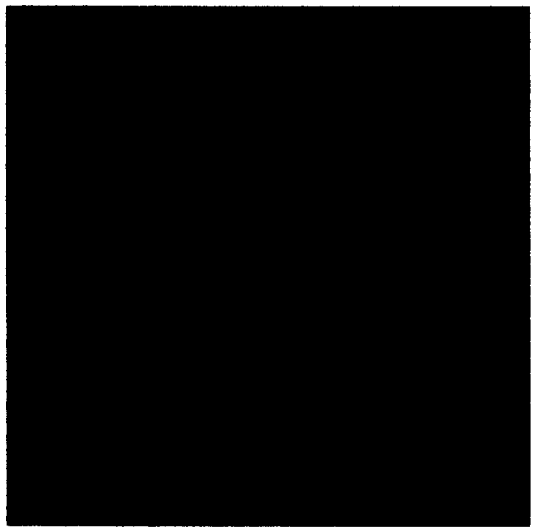
FIGS. 7a–7h are a series of illustrations generated by the PhotoShop software showing the portions of the FIG. 6 drawing having the selected shades of gray therein.
Figure 7B:
Figure 7C:
Figure 7D:
Figure 7E:
Figure 7F:
Figure 7G:
Figure 7H:
Figure 8A:
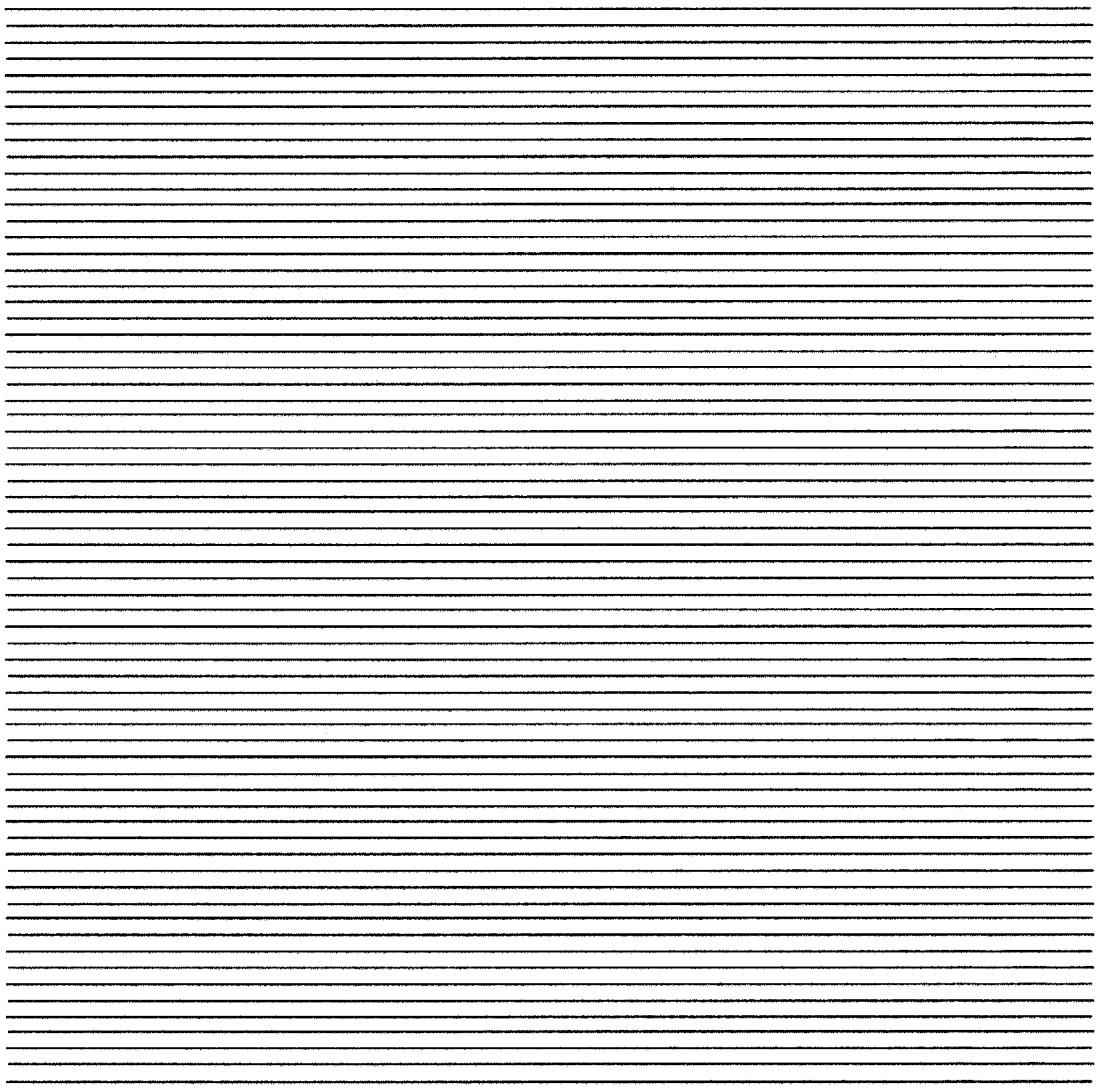
FIGS. 8a–8h are reverse, unshaded illustrations of the FIGS. 7a–7h illustrations with lines therein corresponding to laser paths.
Figure 8B:
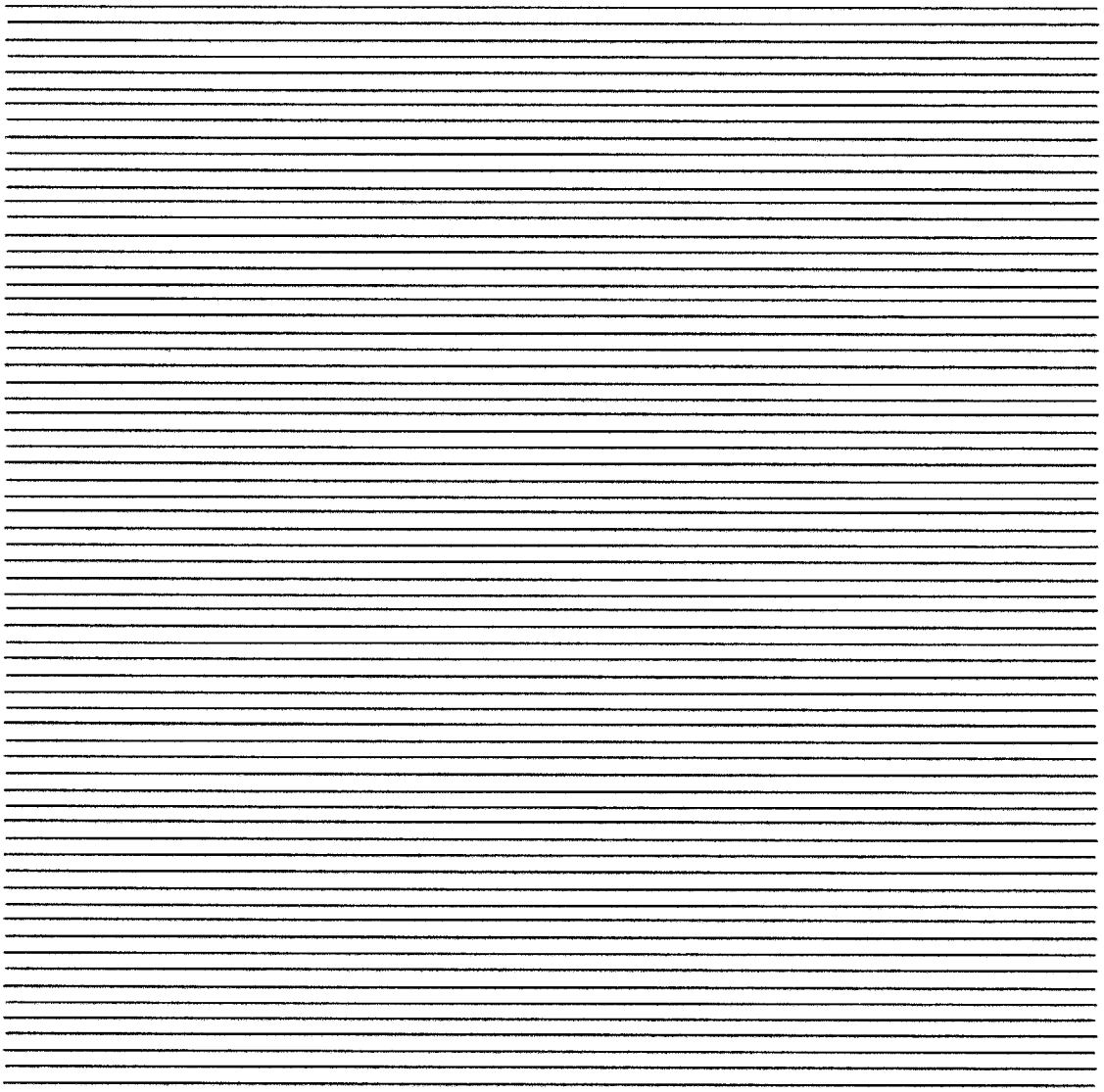
Figure 8C:
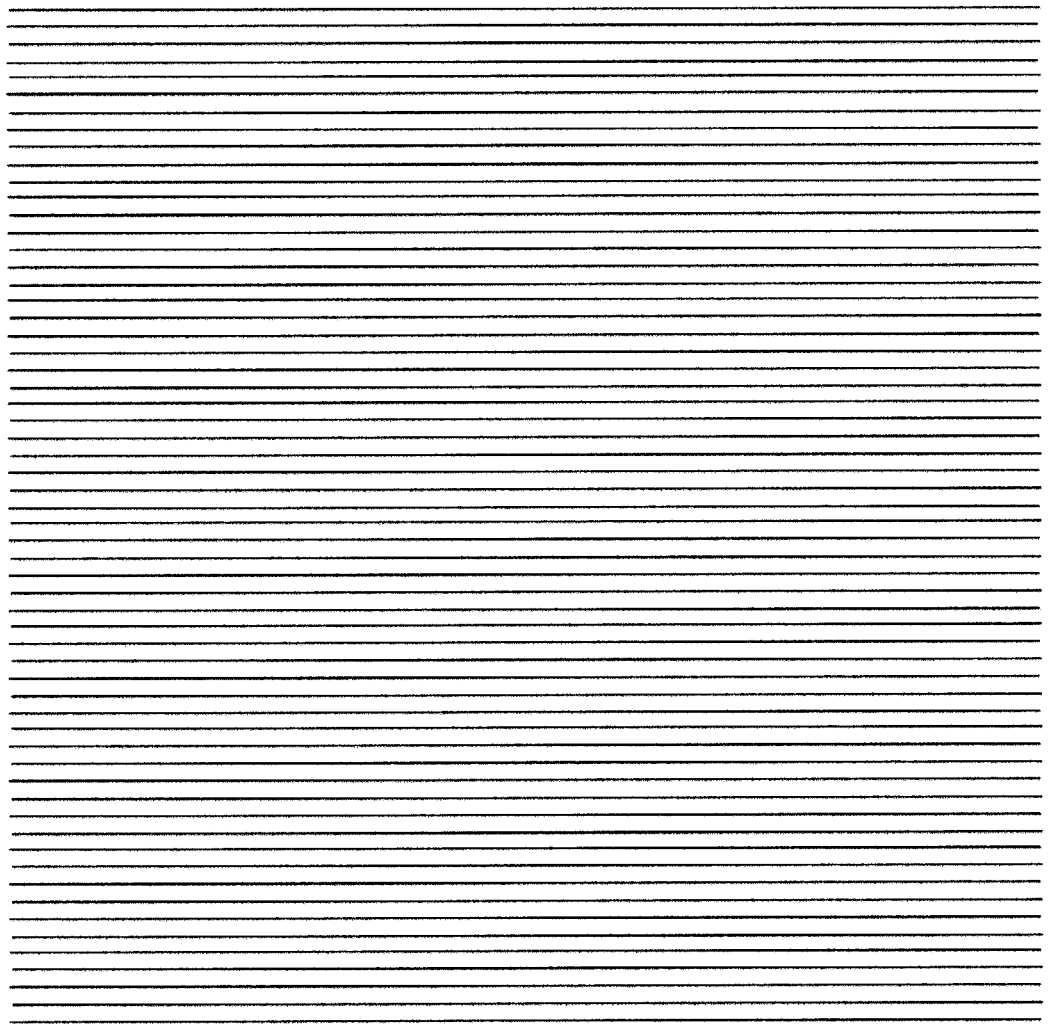
Figure 8D:
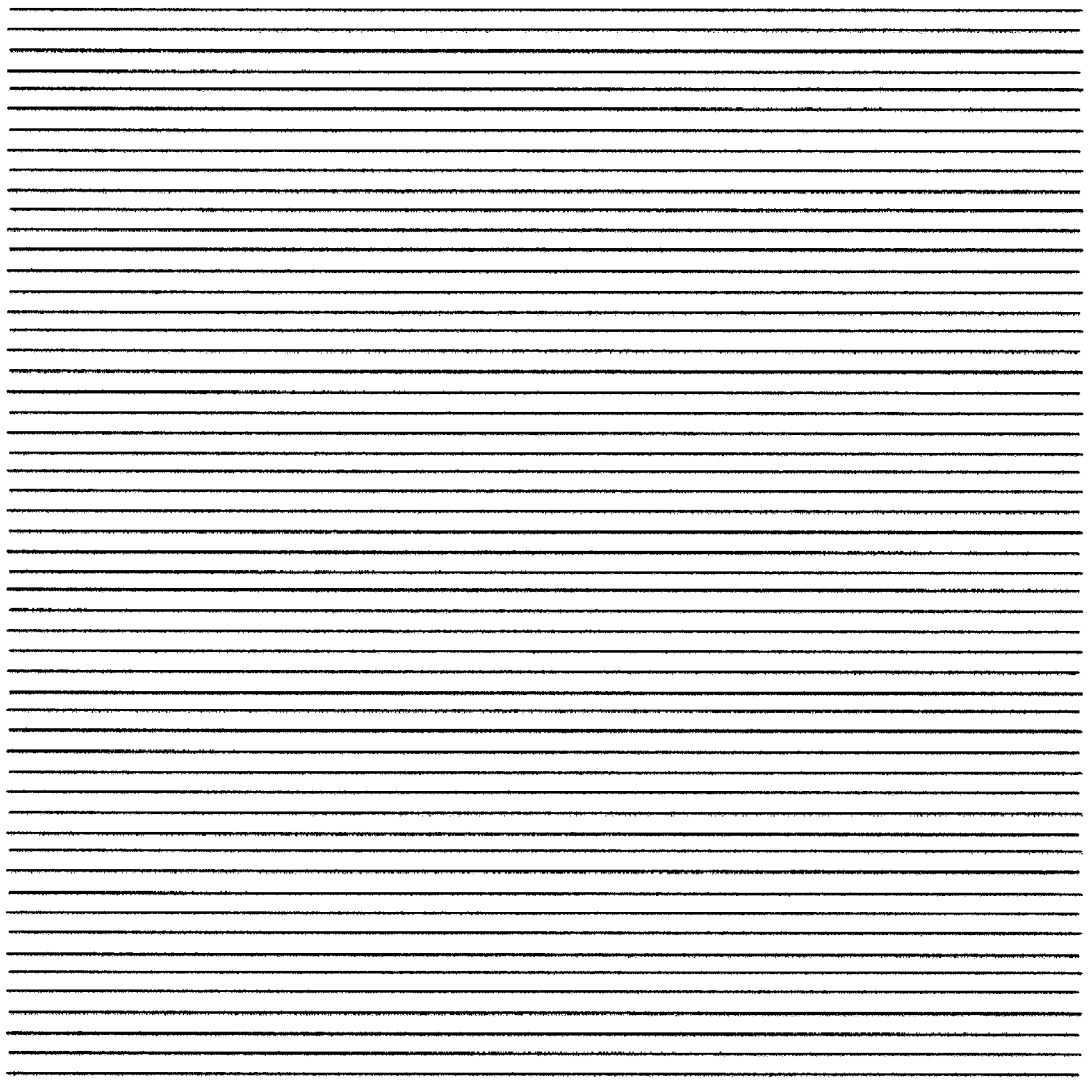
Figure 8E:
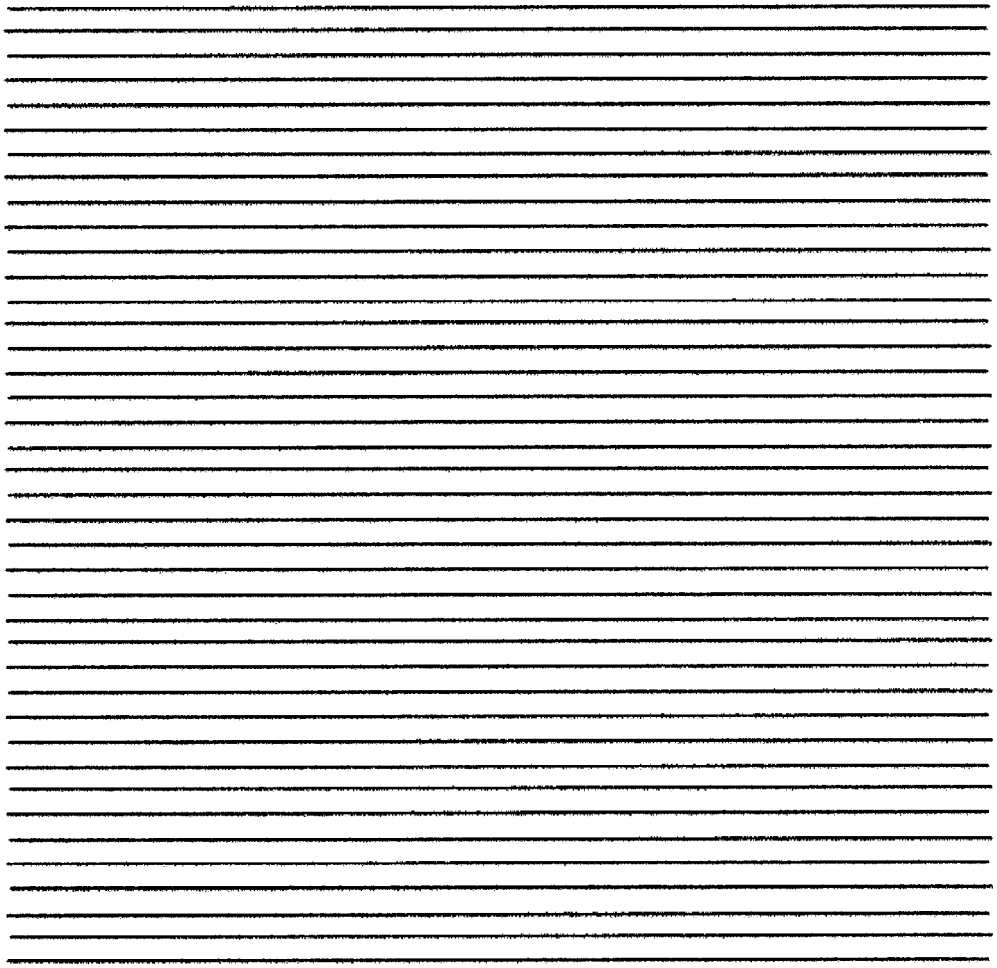
Figure 8F:
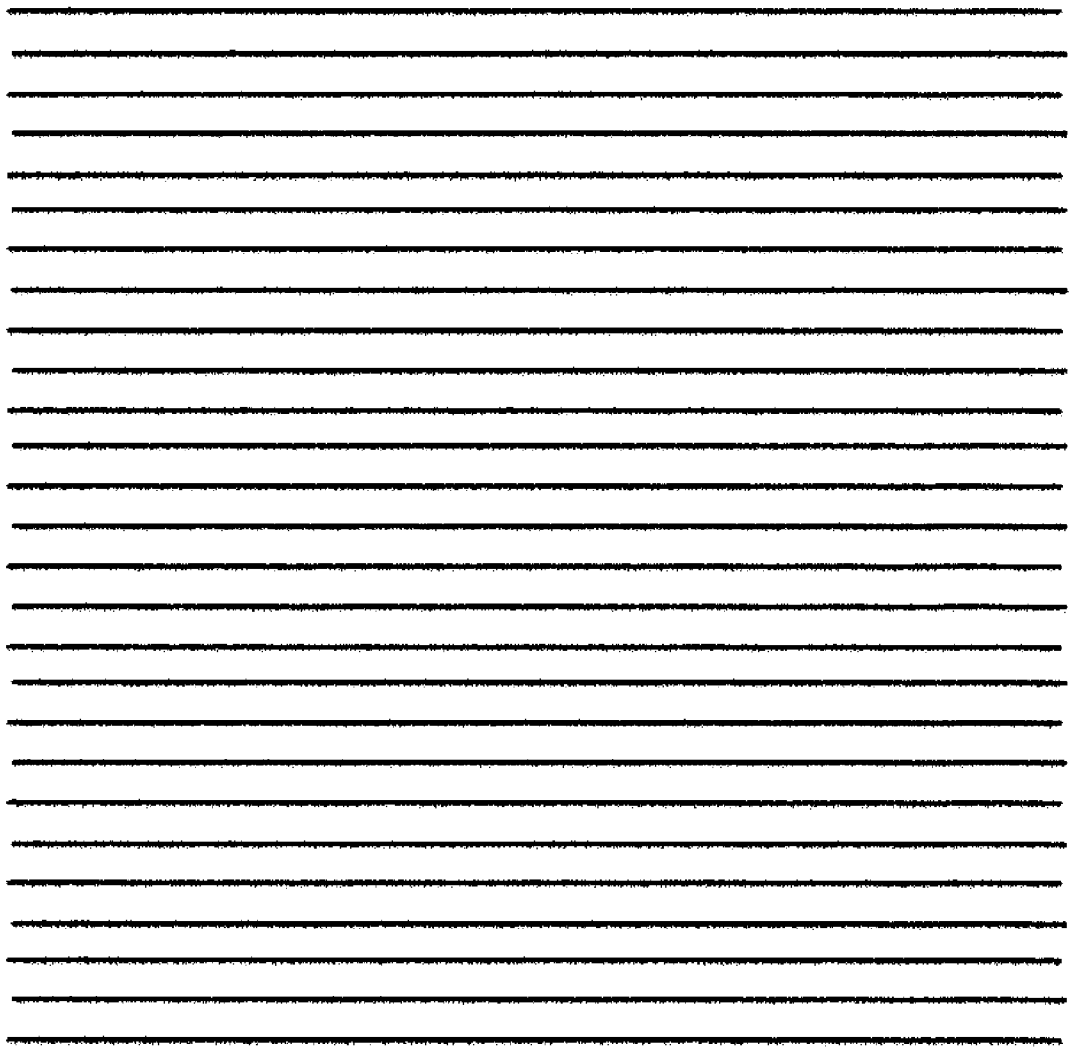
Figure 8G:
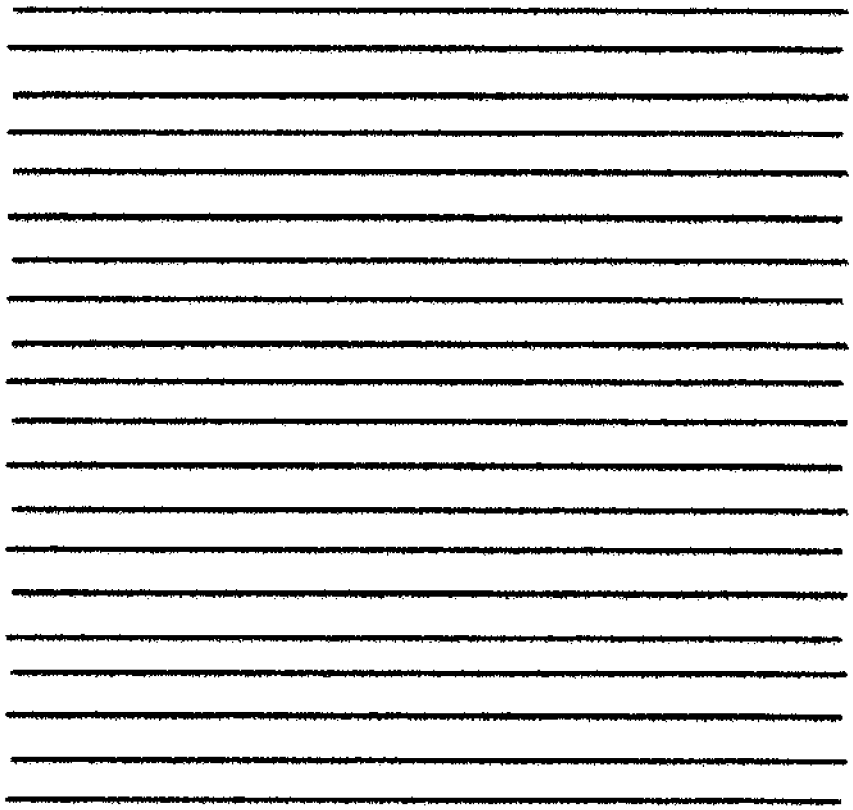
Figure 8H:
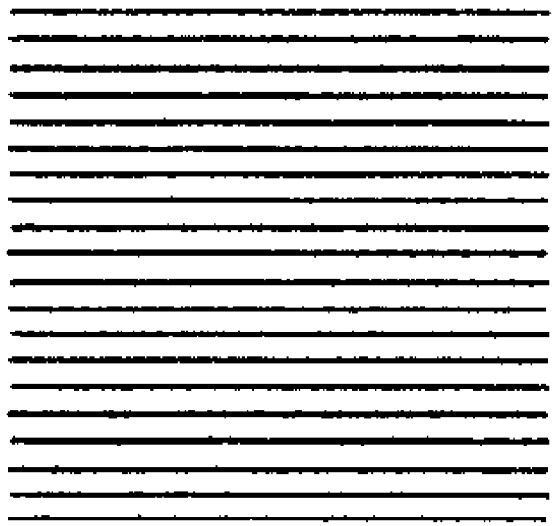

FIG. 6 shows a drawing presented to the PhotoShop program for creating a pyramid engraving in the workpiece 140. The accompanying matrix designates the shades of gray found in the drawing. Again the black images in FIGS. 7*a*–7*b* are generated which designate the portions of the FIG. 6 drawing containing the selected shade as well as all lighter shades appearing in layers therebelow. Reverse images (FIGS. 8*a*–8*h*) of such drawings are then generated with lines drawn therein designating laser paths.

Figure 9:
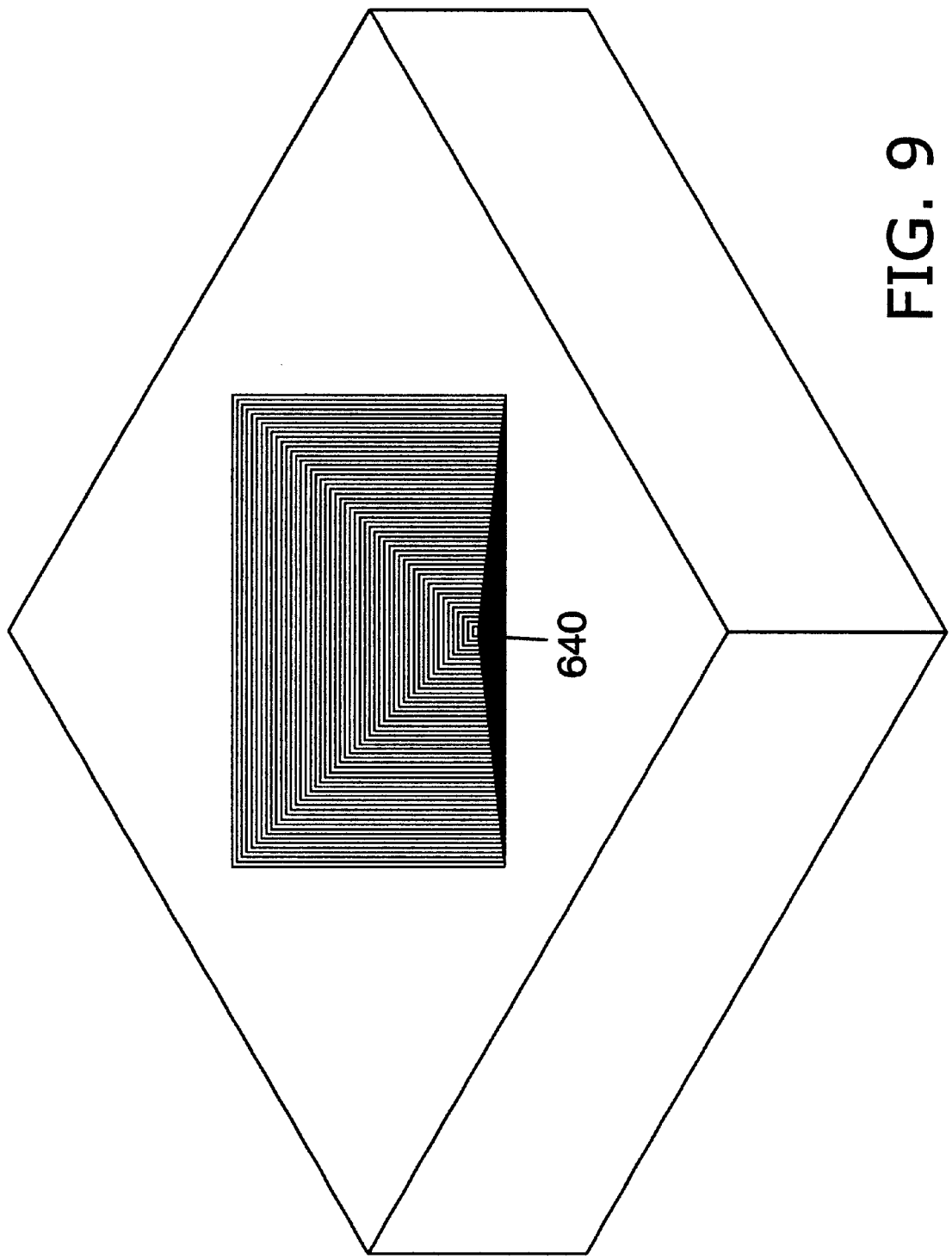
FIG. 9 is a perspective view of the block of FIG. 1 with the pyramid engraved therein.
Figure 10:
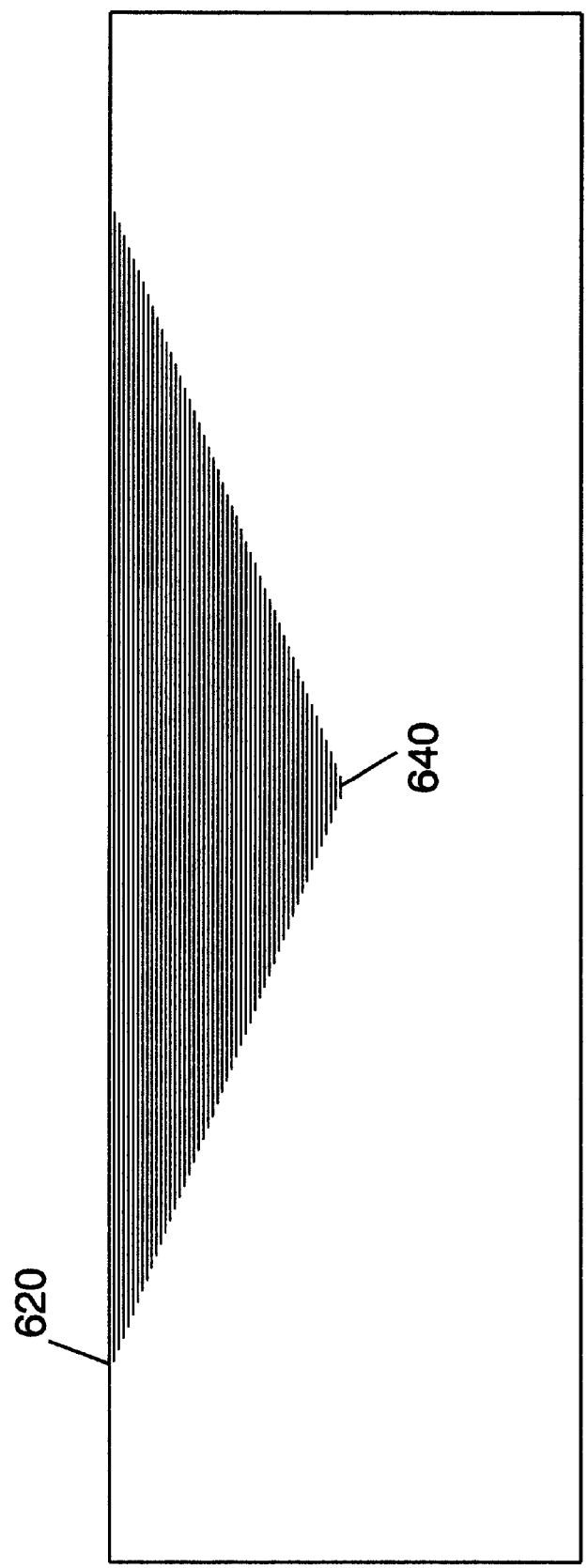
FIG. 10 is a sectional elevation view of the block of FIG. 9.

Once these illustrations are lined/crosshatched, they are presented to the laser system software which sequentially reads the drawings and guides the laser along the workpiece according to the drawings in a layer by layer manner to arrive at the pyramid engraving as shown in FIG. 9. (Again more layers are shown as removed in FIG. 9 than drawings 8*a*–8*h*. It is understood that each layer will have its own drawing.)

Figure 11:
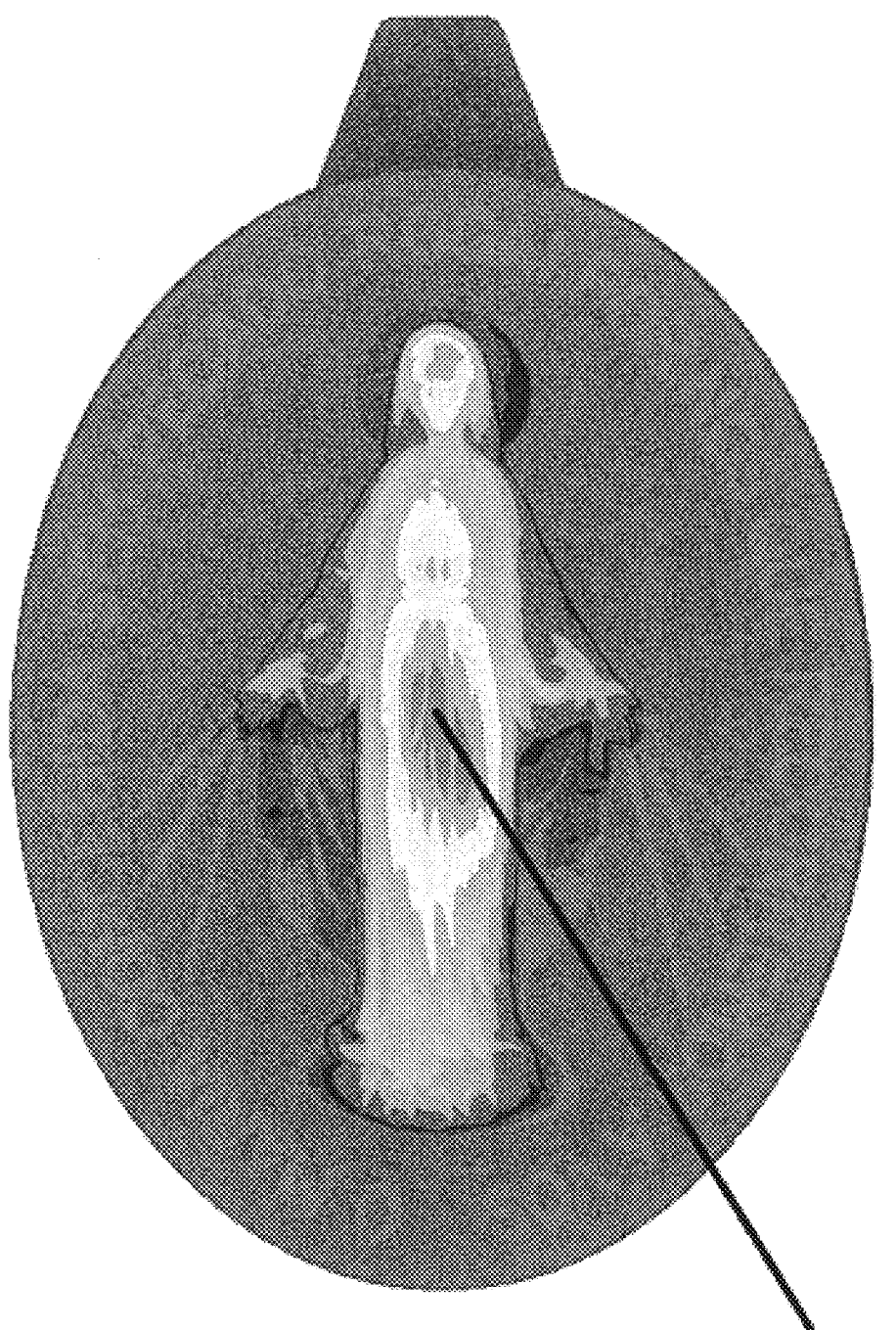
FIG. 11 is a two-dimensional drawing showing an angel illustration to be engraved into the workpiece.
Figure 13A:
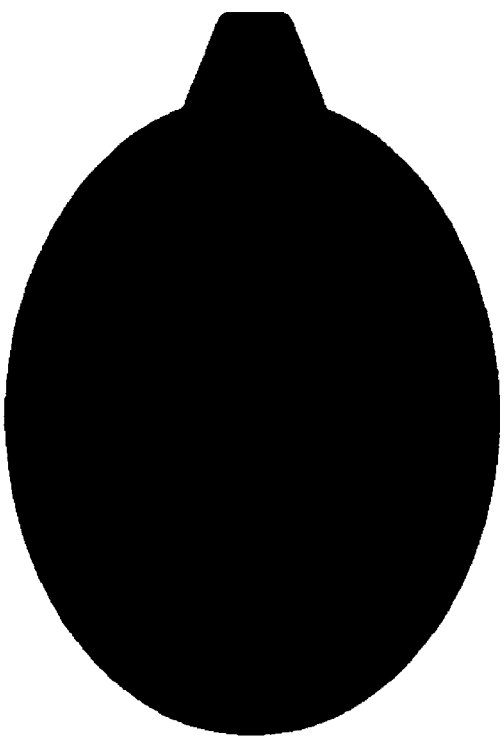
FIGS. 13a–13p are illustrations showing the portions of the FIG. 12 image having the selected shades of gray therein.
Figure 13B:
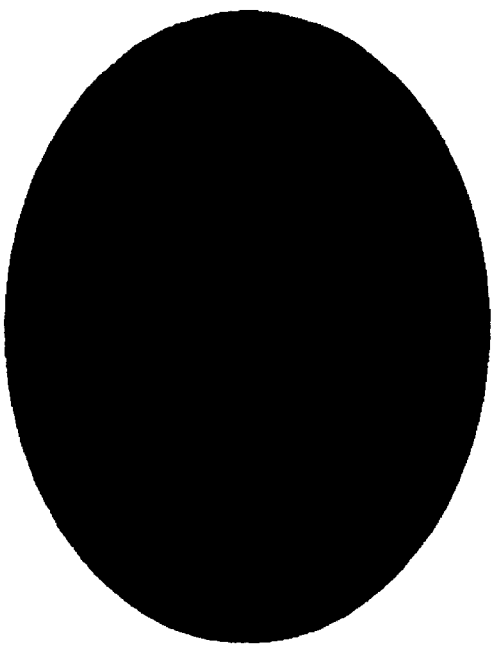
Figure 13C:
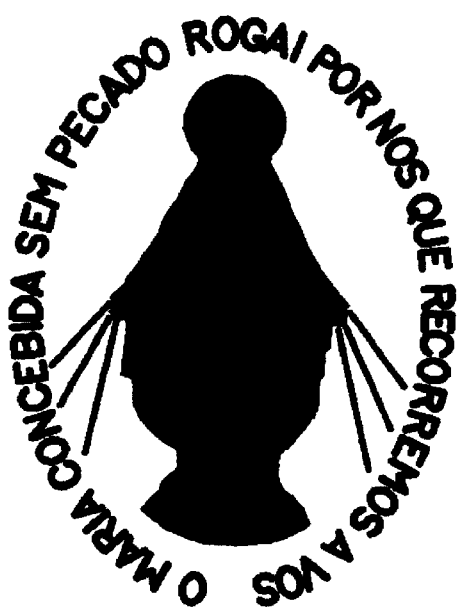
Figure 13D:
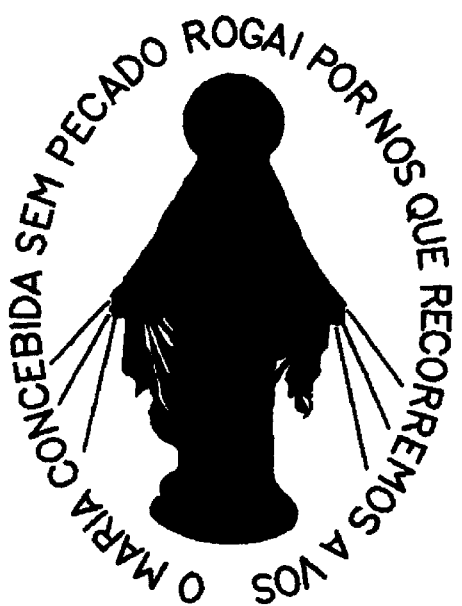
Figure 13E:
Figure 13F:
Figure 13G:
Figure 13H:
Figure 13I:
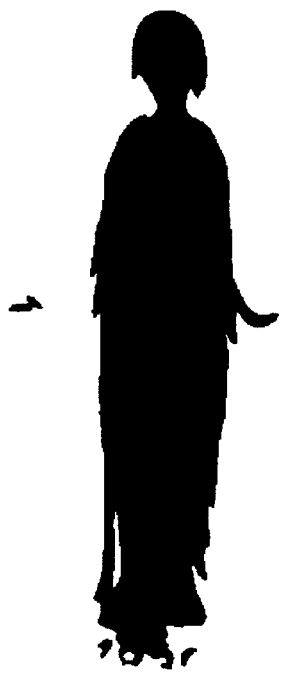
Figure 13J:
Figure 13K:
Figure 13L:
Figure 14A:
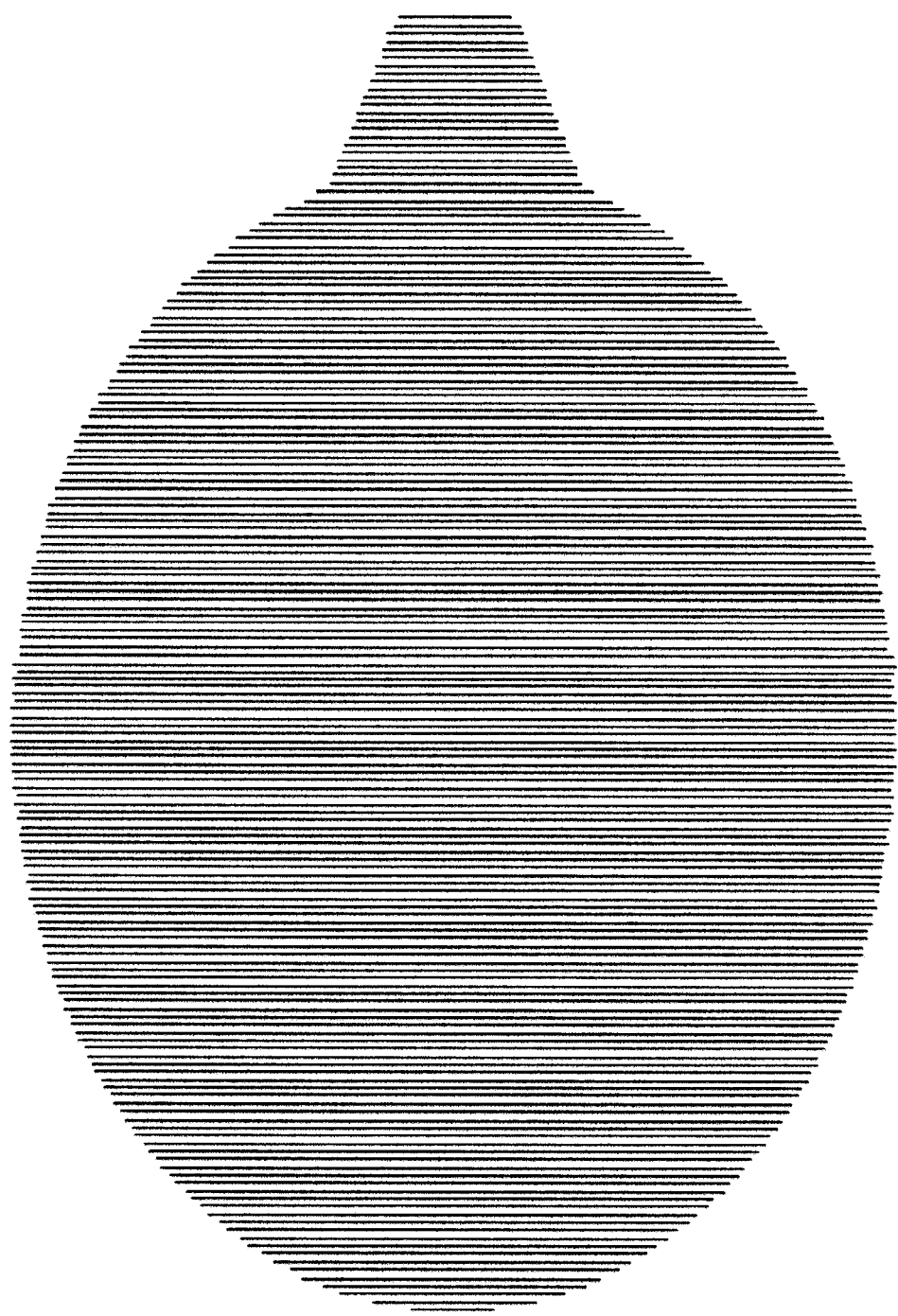
FIGS. 14a–14h illustrate the reverse images of a portion of the diagrams of FIGS. 13a–13p with laser lines etched therein.
Figure 14B:
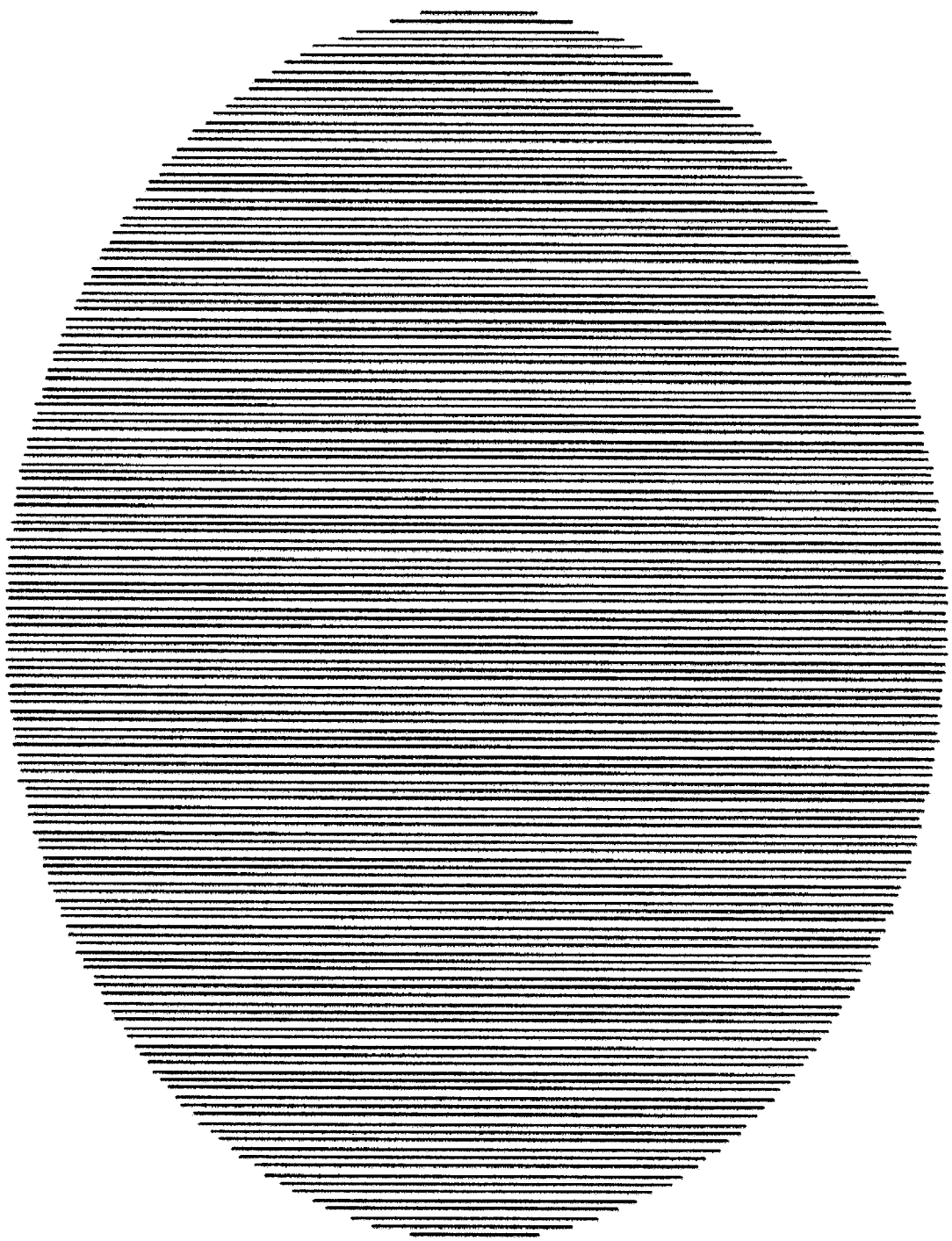
Figure 14C:
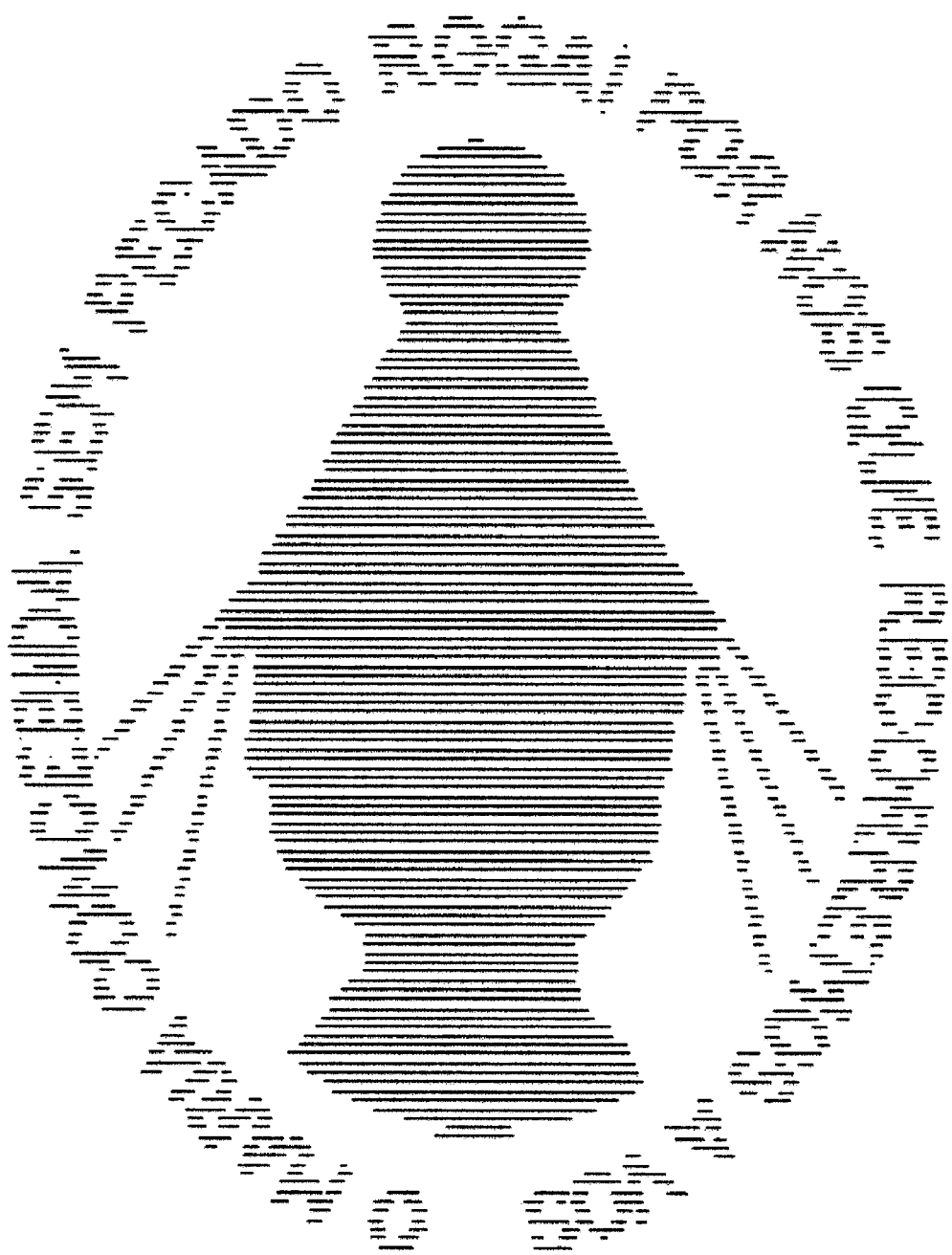
Figure 14D:
Figure 14E:
Figure 14F:
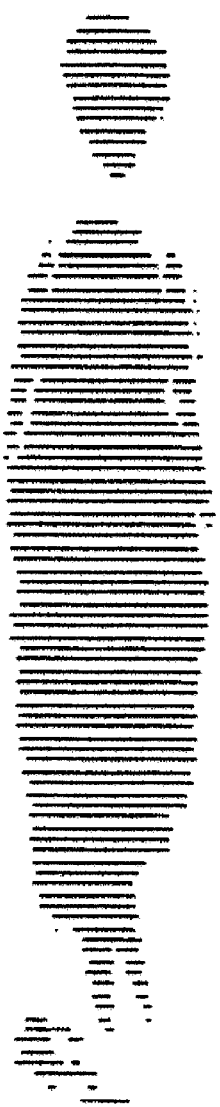
Figure 14G:
Figure 14H:
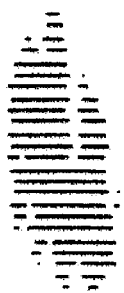
Figure 15:
FIG. 15 illustrates a top view of the image as engraved into the workpiece.

FIG. 11 shows an angel plaque. As above described this angel image is presented to the computer. The found shades of gray are designated in the accompanying matrix as provided by the Adobe PhotoShop software. Illustrations corresponding to the selected shades are then generated as shown in FIGS. 13*a*–13*p*. FIG. 13*p* corresponds to the white shade 13*p* found in the FIG. 11 drawing and will be the deepest point of the engraving. Again, the portion to be engraved in FIG. 13*p* will also be included in FIGS. 13*a*–13*o* as all material from the layers above the layer corresponding to FIG. 13*p* must first be removed in order to reach this layer. These images are then reversed with lines therein as above described. The pieces of artwork forming the composite angel image are then presented to the laser system computer software. For the first layer of the workpiece, the first piece of artwork (FIG. 14*a*) is presented. The laser software translates the lines on this first piece of artwork, including the lines inserted thereon into signals corresponding to laser paths. Upon receipt of these signals, the control assembly directs the laser beam along the workpiece in correspondence with these laser paths to remove material from the layer of the workpiece in a layer-by-layer sequence.

Accordingly, the above method illustrates a method of providing artwork to a laser engraving system which will enable the laser to remove material from a workpiece in a sequential layer manner. The material to be removed from each layer corresponds to a provided piece of artwork having various colors thereon corresponding to depths of the artwork so as to provide three-dimensional aspects thereto. Thus, the original drawing is created such that the various shades therein will correspond to various selected depths to be engraved into the workpiece. The above method can be directed to a grayscale analysis as well as to other color scales utilizing the methods described therein. It is also understood that the above method has been primarily explained wherein the whitest shade is the deepest point of the engraving. This process can be reversed such that the darkest shade corresponds to the deepest point of the engraving.

It is also to be understood that while certain forms of this invention have been illustrated and described in relation to the use of computer software, it is not limited thereto, except in so far as such limitations are included in the following claims.

Having thus described the invention, what is claimed as new and desired to be secured by Letters Patent is:

1. In a laser system having a laser beam, a control assembly for directing the laser beam along a workpiece, a system program adapted to translate artwork into control assembly signals corresponding to laser paths along the workpiece, a method of engraving a three-dimensional image into the workpiece comprising the steps of:

(a) providing composite artwork including a plurality of component pieces for depicting a three-dimensional image to be engraved into the workpiece;

(b) designating a first layer of the workpiece for penetration by the laser beam, said first layer having a thickness less than a maximum depth of the image to be engraved into the workpiece;

(c) designating on one of said component pieces of artwork portions of the image of said artwork for engraving into said designated first layer of the workpiece;

(d) communicating said component piece of artwork having said designated portions in step (c) to the system program for translating said designated artwork portions into control assembly signals corresponding to laser paths along the workpiece;

(e) communicating said control signals to the laser system control assembly for directing the laser beam along said laser paths, the penetrating interaction of the laser beam with the workpiece removing material from the workpiece in said first layer along said laser paths;

(f) designating a subsequent layer of the workpiece for penetration with the laser beam, said subsequent layer adjacent a layer of the workpiece having previously undergone said interaction with said laser beam;

(g) designating on another of one of said component pieces of artwork portions of the image on said artwork for engraving into said layer of the workpiece designated in step (f);

(h) communicating said component piece of artwork having said designated portions in step (g) to the system program for translating said designated artwork portions in step (g) into control assembly signals corresponding to laser paths along the workpiece;

(i) communicating said control signals to the laser system control assembly for directing the laser beam along said laser paths in step (h), the interaction of the laser beam with said workpiece removing material from said workpiece in said designated layer of step (f) along said laser paths of step (h);

(j) repeating steps (f)–(i) for each subsequent layer of workpiece material until the image is engraved in the workpiece.

2. The system as claimed in claim 1 wherein said designated first workpiece layer comprises a top layer of the workpiece.

3. The system as claimed in claim 1 wherein said designated first layer and subsequent workpiece layers are generally equal in thickness.

4. The system as claimed in claim 1 wherein said step (e) includes operating the laser beam at a generally constant power throughout said interaction of the laser beam with said designated first layer.

5. The system as claimed in claim 1 wherein said step (i) includes operating the laser beam at a generally constant power throughout said interaction of the laser beam with each said designated subsequent layer of the workpiece.

6. In a laser system having a laser beam, a control assembly for directing the laser beam along a workpiece, a system program adapted to translate artwork into control assembly signals corresponding to laser paths along the workpiece, a method of engraving a three-dimensional image into the workpiece comprising the steps of:

(a) providing a plurality of component pieces of artwork for depicting a composite three-dimensional image to be engraved into the workpiece, each component piece of said artwork including color shades therein between a selected darkest and lightest color shade, each of said shades corresponding to an area of laser penetration for engraving of the image into the workpiece;

(b) selecting a scale having a range of shades between the selected darkest shade and the selected lightest shade;

(c) designating a first layer of the workpiece to be penetrated by the laser beam corresponding to said selected darkest or lightest shade, said first layer having a depth less than a maximum depth of the image to be engraved in the workpiece;

(d) designating one of said component pieces of artwork, said designated component piece having portions of the image of said artwork to be engraved into said designated first layer of the workpiece, said portions corresponding to portions of the component artwork piece containing said selected darkest or lightest shade;

(e) communicating said designated portions on said component piece of artwork to the system program in a manner for translating said designated artwork portions into control assembly signals corresponding to laser paths along the workpiece;

(f) communicating said control signals to the laser system control assembly for directing the laser beam along said laser paths, the interaction of the laser beam with the workpiece removing material from the workpiece in said first layer along said laser paths;

(g) designating a subsequent layer of the workpiece to be penetrated by the laser beam corresponding to a selected adjacent shade on said scale adjacent a previously selected shade, said layer adjacent a layer of the workpiece having undergone said interaction with said laser beam;

(h) designating another of said component pieces of artwork portions of the image of said artwork to be engraved into said layer of the workpiece designated in step (g), said designated portions corresponding to portions of the artwork containing said selected shade in step (g);

(i) communicating said designated portions on said component piece of artwork designated in step (h) to the system program for translating said designated artwork portions in step (h) into control signals corresponding to laser paths along the workpiece;

(j) communicating said control signals to the laser system control assembly for directing the laser beam along said laser paths in step (i), the interaction of the laser beam with said workpiece removing material from said workpiece in said designated layer of step (g) along said laser paths of step (i);

(k) repeating steps (g)–(j) for each subsequent layer of material until the image is engraved in the workpiece.

7. The system as claimed in claim 6 wherein said color shade is color shades of a grayscale.

8. The system as claimed in claim 6 wherein said designated first workpiece layer comprises a top layer of the workpiece.

9. The system as claimed in claim 6 wherein said step (f) includes directing the laser beam along said first layer at a generally constant power.

10. The system as claimed in claim 6 wherein said step (j) includes directing the laser beam at a generally constant power along said designated layer.

11. The system as claimed in claim 6 wherein said step (c) includes selecting said darkest shade.

12. In a laser system having a laser beam assembly having means for translating lines on artwork into laser paths for a laser beam along a workpiece, a method of engraving a three-dimensional image into a workpiece comprising the steps of:

(a) providing a plurality of component pieces of artwork depicting a composite three-dimensional image to be engraved into the workpiece, each of said component pieces of artwork having a color shade thereon, the composite image having a plurality of said color shades thereon representative of the three-dimensional aspects of said image;

(b) designating a layer of said workpiece to be penetrated by the laser beam;

(c) designating one of said component pieces of said artwork to be engraved into said designated step (b) layer of the workpiece, said designated component pieces having portions thereon corresponding to one of said selected color shades;

(d) communicating said designated portions of said artwork component piece in step (c) associated with said designated layer of step (b) to the laser beam assembly for translating said designated selected shade portions on said component piece of step (c) into lines indicative of laser paths;

(e) communicating said laser paths on said component artwork piece to the beam assembly for directing the laser beam along said workpiece in correspondence to said laser paths, the interaction of said laser beam with said workpiece removing material from said workpiece in said designated layer of step (b) along said laser paths;

(f) repeating steps (b)–(e) for each subsequent layer of material in the workpiece in correspondence with another selected color shade of said plurality of shades until the total image is engraved in the workpiece.

13. The system as claimed in claim 12 wherein said color shades comprise the color shades of a grayscale.

14. The system as claimed in claim 12 wherein said layer of workpiece material designated in step (b) include a first layer adjacent an exterior surface of said workpiece.

15. The system as claimed in claim 14 wherein said first layer is adjacent a top surface of said workpiece.

16. The system as claimed in claim 12 wherein said step (e) includes directing the laser beam along said workpiece at a generally constant power.

17. In a laser system having a laser beam assembly having means for translating artwork into laser paths along a workpiece for directing a laser beam along the workpiece, a method of engraving a three-dimensional image into a workpiece comprising the steps of:

(a) providing a plurality of component pieces of artwork depicting a three-dimensional composite image to be engraved into the workpiece, each said component piece of artwork having a selected color shade thereon corresponding to a depth of the image to be engraved into the workpiece;

(b) designating a plurality of layers of said workpiece to be penetrated by the laser beam, said layers at a fixed thickness less than a maximum depth of said image to be engraved into the workpiece, each said piece of component artwork corresponding to a designated layer of the workpiece;

(c) selecting said color shade on said component piece of composite artwork corresponding to one of said designated layers of the workpiece;

(d) communicating said component piece of said artwork corresponding to said one designated layer in step (c) to the laser beam assembly for translating said selected step (c) shade on said corresponding artwork component piece into laser paths;

(e) communicating said laser paths to the laser beam assembly for directing the laser beam along said designated workpiece layer in correspondence to said step (d) laser paths, the interaction of said laser beam with said workpiece removing material from said designated workpiece layer along said laser paths;

(f) selecting an adjacent subsequent layer of said designated layers of said workpiece to be penetrated by the laser beam, said layer becoming said step (c) one designated layer;

(g) repeating steps (c)–(f) for each subsequent designated layer of material in the workpiece until the total image is engraved in the workpiece.

18. The system as claimed in claim 17 wherein said color shades are found in a grayscale.

19. The system as claimed in claim 17 wherein said designated layers begin with a top layer of the workplace, said subsequent layer in step (f) being below said top layer.

20. The system as claimed in claim 19 wherein a final layer of said plurality of layers includes the maximum depth of engraving of the image to be engraved into the workpiece.

* * * * *

UNITED STATES PATENT AND TRADEMARK OFFICE
CERTIFICATE OF CORRECTION

PATENT NO. : 6,300,595 B1  Page 1 of 1
DATED : October 9, 2001
INVENTOR(S) : Mark S. C. Williams It is certified that error appears in the above-identified patent and that said Letters Patent is hereby corrected as shown below:

Column 10,
Line 59, delete "workplace" and substitute -- workpiece --.

Signed and Sealed this

Fifth Day of March, 2002

Attest:

JAMES E. ROGAN
*Attesting Officer*  *Director of the United States Patent and Trademark Office*